US011977651B2

(12) United States Patent
Shapira et al.

(10) Patent No.: US 11,977,651 B2
(45) Date of Patent: May 7, 2024

(54) SYSTEMS AND METHODS FOR SECURING FILES AND/OR RECORDS

(71) Applicant: RecoLabs Inc, Wilmington, DE (US)

(72) Inventors: Tal Shapira, Jerusalem (IL); Eyal Asulin, Tel Aviv (IL)

(73) Assignee: RecoLabs Inc, Wilmington, DE (US)

( * ) Notice: Subject to any disclaimer, the term of this patent is extended or adjusted under 35 U.S.C. 154(b) by 357 days.

(21) Appl. No.: 17/462,119

(22) Filed: Aug. 31, 2021

(65) Prior Publication Data

US 2023/0067858 A1 Mar. 2, 2023

(51) Int. Cl.
*G06F 21/00* (2013.01)
*G06F 9/54* (2006.01)
*G06F 16/174* (2019.01)
*G06F 21/62* (2013.01)

(52) U.S. Cl.
CPC ............ *G06F 21/6218* (2013.01); *G06F 9/54* (2013.01); *G06F 16/1748* (2019.01)

(58) Field of Classification Search
CPC .... G06F 21/6218; G06F 9/54; G06F 16/1748; G06F 21/554
See application file for complete search history.

(56) References Cited

U.S. PATENT DOCUMENTS

| | | | | |
|---|---|---|---|---|
| 8,938,500 | B1 * | 1/2015 | Acharya | G06Q 50/01 709/204 |
| 10,922,282 | B2 * | 2/2021 | Jalagam | G06F 16/288 |
| 11,321,059 | B2 * | 5/2022 | Lee | G06F 8/38 |
| 11,412,049 | B2 * | 8/2022 | Morkovine | H04L 67/535 |
| 2015/0142767 | A1 * | 5/2015 | Wu | G06F 16/951 707/706 |
| 2016/0364753 | A1 * | 12/2016 | Zhang | G06Q 30/0255 |
| 2020/0067936 | A1 * | 2/2020 | Ojha | H04L 63/1416 |
| 2020/0153934 | A1 * | 5/2020 | Burbank | H04L 41/0893 |
| 2021/0112080 | A1 * | 4/2021 | Chen | G06N 3/08 |
| 2021/0243212 | A1 * | 8/2021 | Bowman | G06N 7/01 |
| 2021/0319402 | A1 * | 10/2021 | Ramaswamy | G06F 16/176 |
| 2023/0177798 | A1 * | 6/2023 | Griffin | G06V 10/764 382/159 |

OTHER PUBLICATIONS

Fathi et al., "Social interactions: A first-person perspective", , 2012 IEEE Conference on Computer Vision and Pattern Recognition (Year: 2012).*

* cited by examiner

*Primary Examiner* — Morshed Mehedi

(74) *Attorney, Agent, or Firm* — AlphaPatent Associates Ltd.; Daniel J. Swirsky

(57) ABSTRACT

There is provided a data security method, comprising: creating an interaction graph, by: analyzing collected interaction events between users and between users and files and/or records, wherein a respective node of the interaction graph represents a specific one of a user, a record, and a file, wherein a respective edge indicates an interaction between respective users or between a respective user and a respective file and/or record, wherein an interaction weight assigned to the respective edge indicates an amount of the interaction, monitoring an attempt by a target user to access a target file and/or record, computing a target interaction weight between the target user and the target file and/or record from the interaction graph, and in response to the target interaction weight being below a target threshold, at least one of: filtering security alerts, and blocking access by the target user to the target file and/or record.

21 Claims, 15 Drawing Sheets

SYSTEMS AND METHODS FOR SECURING FILES AND/OR RECORDS

FIELD AND BACKGROUND OF THE INVENTION

The present invention, in some embodiments thereof, relates to access control and, more specifically, but not exclusively, to systems and methods for securing files and/or records.

Traditional approaches for securing files and/or records include user set passwords, a user providing links to other users for accessing the file, and an administrative setting permission levels for users.

SUMMARY OF THE INVENTION

According to a first aspect, a computer implemented method for securing at least one of files and records, comprises: creating an interaction graph, by: collecting a plurality of interaction events between users and between users and at least one of files and records, computing the interaction graph according to an analysis of the plurality of interaction events, wherein a respective node of the interaction graph represents one of a specific user, a specific record, and a specific file, wherein a respective edge indicates an interaction between respective users or between a respective user and a respective file or a respective record, wherein an interaction weight assigned to the respective edge indicates an amount of the interaction, monitoring an attempt by a target user to access at least one of a target file and a target record, computing a target interaction weight between the target user and at least one of the target file and the target record from the interaction graph, and in response to the target interaction weight being below a target threshold, at least one of: (i) filtering security alerts, wherein alerts that correspond to the target user and at least one of the target file and target record are flagged, and (ii) blocking access by the target user to the at least one of target file and target record.

According to a second aspect, a system for securing at least one of files and records, comprising: at least one hardware processor executing a code for: creating an interaction graph, by: collecting a plurality of interaction events between users and between users and at least one of files and records, computing the interaction graph according to an analysis of the plurality of interaction events, wherein a respective node of the interaction graph represents one of a specific user, a specific record, and a specific file, wherein a respective edge indicates an interaction between respective users or between a respective user and a respective file or a respective record, wherein an interaction weight assigned to the respective edge indicates an amount of the interaction, monitoring an attempt by a target user to access a at least one of target file and target record, computing a target interaction weight between the target user and the at least one of target file and target record from the interaction graph, and in response to the target interaction weight being below a target threshold, at least one of: (i) filtering security alerts, wherein alerts that correspond to the target user and at least one of the target file and target record are flagged, and (ii) blocking access by the target user to the at least one of target file and target record.

According to a third aspect, a non-transitory medium storing program instructions for securing at least one of files and records, which, when executed by a processor, cause the processor to: create an interaction graph, by: collect a plurality of interaction events between users and between users and at least one of files and records, compute the interaction graph according to an analysis of the plurality of interaction events, wherein a respective node of the interaction graph represents one of a specific user, a specific record, and a specific file, wherein a respective edge indicates an interaction between respective users or between a respective user and a respective file or a respective record, wherein an interaction weight assigned to the respective edge indicates an amount of the interaction, monitor an attempt by a target user to access a at least one of target file and target record, compute a target interaction weight between the target user and the at least one of target file and target record from the interaction graph, and in response to the target interaction weight being below a target threshold, at least one of: (i) filtering security alerts, wherein alerts that correspond to the target user and at least one of the target file and target record are flagged, and (ii) blocking access by the target user to the at least one of target file and target record.

In a further implementation form of the first, second, and third aspects, the interaction weights are ground truth labels obtained by an unsupervised approach according to the analysis of the interaction events.

In a further implementation form of the first, second, and third aspects, interaction weights of the interaction graph are computed by aggregating sub-weights of sub-graphs, and further comprising accessing at least one triplet of node-edge-node having a respective sub-interaction weight used to compute the target interaction weight, and providing at least one member of a group for indicating a context for the outcome of the target interaction weight, the group consisting of: the at least one triplet and corresponding sub-weight, an interaction category or the at least one triplet.

In a further implementation form of the first, second, and third aspects, the target interaction weight between the target user and the at least one of target file and target record is computed as a function of at least one of: (i) interaction weights between the target user and at least one other user having interaction weights with the at least one of target file and target record above a social connection threshold, and (ii) interaction weights between the target user at least one of another file and another record having interaction weights with at least one other user above a file connection threshold.

In a further implementation form of the first, second, and third aspects, further comprising at least one of: (i) normalizing the interaction weights between the target user and each respective other user according to interaction between the respective other user and additional users connected by edges to the respective other user, and (ii) normalizing the interaction between the target user and each of the at least one of another file and another record according to interaction between the at least one of respective another file and respective another record and additional users connected by edges to the at least one of respective another file and respective another record.

In a further implementation form of the first, second, and third aspects, further comprising providing at least one member of a group for indicating a context for the outcome of the target interaction weight, the group consisting of: (i) the at least one other user, (ii) the interaction weights between the target user and the at least one other user, (iii) the at least one of another file and another record, (iv) the interaction weights between the target user at least one of another file and another record, (iv) at least one interaction type category of the interaction between the target user and the at least one other user, (v) at least one interaction type category of the interaction between the target user and the at least one of another file and another record, (vi) a time from an interaction of the target user with the at least one of target file and target record to a current time of the attempted access, (vii) a time from an interaction of the target user with other users that interacted with the at least one of target file and target record to the current time of the attempted access, and (viii) a time from an interaction of the target user with the at least one of target file and target record to a time from an interaction of the target user with other users that interacted with the at least one of target file and target record.

In a further implementation form of the first, second, and third aspects, further comprising: adjusting interaction weights of the interaction graph according to a decay parameter computed as a function of at least one of: (i) a time from an interaction of the target user with the at least one of target file and target record to a current time of the attempted access, (ii) a time from an interaction of the target user with other users that interacted with the at least one of target file and target record to the current time of the attempted access, and (iii) a time from an interaction of the target user with the at least one of target file and target record to a time from an interaction of the target user with other users that interacted with the at least one of target file and target record.

In a further implementation form of the first, second, and third aspects, the decay parameter is set according to a statistical distribution of (i), (ii), and (iii) for interactions between a plurality of users and/or a plurality of at least one of files and records.

In a further implementation form of the first, second, and third aspects, the creating the interaction graph is iterated over a plurality of time intervals for computing a plurality of interaction graphs, and further comprising training a graph neural network on the plurality of interaction graphs, wherein obtaining the target interaction weight comprises obtaining the target interaction weight by feeding the target user and the at least one of target file and target record into the graph neural network.

In a further implementation form of the first, second, and third aspects, the plurality of interaction evens are obtained from a plurality of data sensors and/or a plurality of application programming interfaces (APIs) that monitor user interactions over a network and/or within a plurality of interaction applications.

In a further implementation form of the first, second, and third aspects, the plurality of interaction events are selected from a group consisting of: participating in an online meeting, organizing the online meeting, accessing a calendar event, sending email, receiving email, reading a file, sharing a file, creating a file, editing a file, accessing a record, reading a record, sharing a record, creating a record, and editing a record.

In a further implementation form of the first, second, and third aspects, computing the interaction graph according to the analysis of the plurality of interaction events comprises: converting action triplets of an edge-node-edge that connect between a first node and a plurality of second nodes, with a plurality of active edges indicating active interaction from the first node to each of the plurality of second nodes, and a plurality of passive edges indicating passive interaction between each pair of the plurality of second nodes, dividing the respective interaction weights of each action triplet to a plurality of interaction weights assigned to the plurality of active edges and the plurality of passive edges.

In a further implementation form of the first, second, and third aspects, computing the interaction graph according to the analysis of the plurality of interaction events comprises: aggregating a plurality of edges between a first node and a second node representing a plurality of interactions of a plurality of sub-categories into a single edge representing a single interaction of a main category, computing the interaction weight for the single edge by aggregating the plurality of interaction weights of the plurality of edges, wherein a respective single edge connects each pair of nodes.

In a further implementation form of the first, second, and third aspects, interaction weights of edges associated with an interaction type category indicating editing of at least one of a file and a record are assigned relatively higher weights than interaction weights of edges associated with an interaction type category indicating viewing of the at least one of file and record.

In a further implementation form of the first, second, and third aspects, interaction weights of edges associated with a specific interaction type category selected from a plurality of interaction type categories is set according to a statistical analysis of the plurality of interaction types between a plurality of at least one of files and records and/or a plurality of users.

In a further implementation form of the first, second, and third aspects, computing the interaction graph comprises: normalizing data obtained from different data sources, removing duplicates, splitting the interaction graph into a plurality of sub-interaction graphs each created from plurality of interaction events collected over a different time interval, for each sub-interaction graph, creating a plurality of sub-sub interaction graphs, each respective sub-sub interaction graph created by aggregating edges and nodes of sub-types of interaction categories into a respective interaction category, for each sub-sub interaction graph, computing a first dataset of interactions between users, a second dataset of interactions between users and at least one of files and records, and a third dataset of interactions between users that involve at least one of files and records, normalizing the first dataset, the second dataset, and the third dataset, wherein a set of the normalized first dataset, the normalized second dataset, and the normalized third dataset, is for each respective interaction category of a plurality of interaction categories for each time interval of a plurality of time intervals, selecting, for each set, the target user and at least one of target file and target record, to create selected first, second, and third datasets, creating a user interaction dataset by aggregating the first dataset and the second dataset, creating an interaction dataset by aggregating the second dataset and the third dataset, computing a respective interaction weight for each respective interaction category, and computing the target interaction weight as an aggregation of a plurality of interactions weights of a plurality of interaction categories.

In a further implementation form of the first, second, and third aspects, further comprising providing the respective interaction weight for each respective interaction category for explainability of the target interaction weight.

In a further implementation form of the first, second, and third aspects, the first dataset and the second dataset are implemented as sparse matrices having a size that is linearly proportional to an amount of interactions.

In a further implementation form of the first, second, and third aspects, the edges are directional, and a respective interaction weight is assigned per directional edge.

In a further implementation form of the first, second, and third aspects, further comprising: identifying at least one similar user that is similar to the target user, identifying at least one of: similar file that is similar to the target file, and similar record that is similar to the target record, computing a similar interaction weight for the at least one similar user and at least one of similar file and similar record, and when the similar interaction weight is statistically significantly different than the target interaction weight, at least one of: setting the target interaction weight to the similar interaction weight, and generating an error message for further investigation.

According to a second aspect, a system for securing at least one of files and records, comprising: at least one hardware processor executing a code for: creating an interaction graph, by: collecting a plurality of interaction events between users and between users and at least one of files and records, computing the interaction graph according to an analysis of the plurality of interaction events, wherein a respective node of the interaction graph represents one of a specific user, a specific record, and a specific file, wherein a respective edge indicates an interaction between respective users or between a respective user and a respective file or a respective record, wherein an interaction weight assigned to the respective edge indicates an amount of the interaction, monitoring an attempt by a target user to access a at least one of target file and target record, computing a target interaction weight between the target user and the at least one of target file and target record from the interaction graph, and in response to the target interaction weight being below a target threshold, at least one of: (i) filtering security alerts, wherein alerts that correspond to the target user and at least one of the target file and target record are flagged, and (ii) blocking access by the target user to the at least one of target file and target record.

According to a third aspect, a non-transitory medium storing program instructions for securing at least one of files and records, which, when executed by a processor, cause the processor to: create an interaction graph, by: collect a plurality of interaction events between users and between users and at least one of files and records, compute the interaction graph according to an analysis of the plurality of interaction events, wherein a respective node of the interaction graph represents one of a specific user, a specific record, and a specific file, wherein a respective edge indicates an interaction between respective users or between a respective user and a respective file or a respective record, wherein an interaction weight assigned to the respective edge indicates an amount of the interaction, monitor an attempt by a target user to access a at least one of target file and target record, compute a target interaction weight between the target user and the at least one of target file and target record from the interaction graph, and in response to the target interaction weight being below a target threshold, at least one of: (i) filtering security alerts, wherein alerts that correspond to the target user and at least one of the target file and target record are flagged, and (ii) blocking access by the target user to the at least one of target file and target record.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
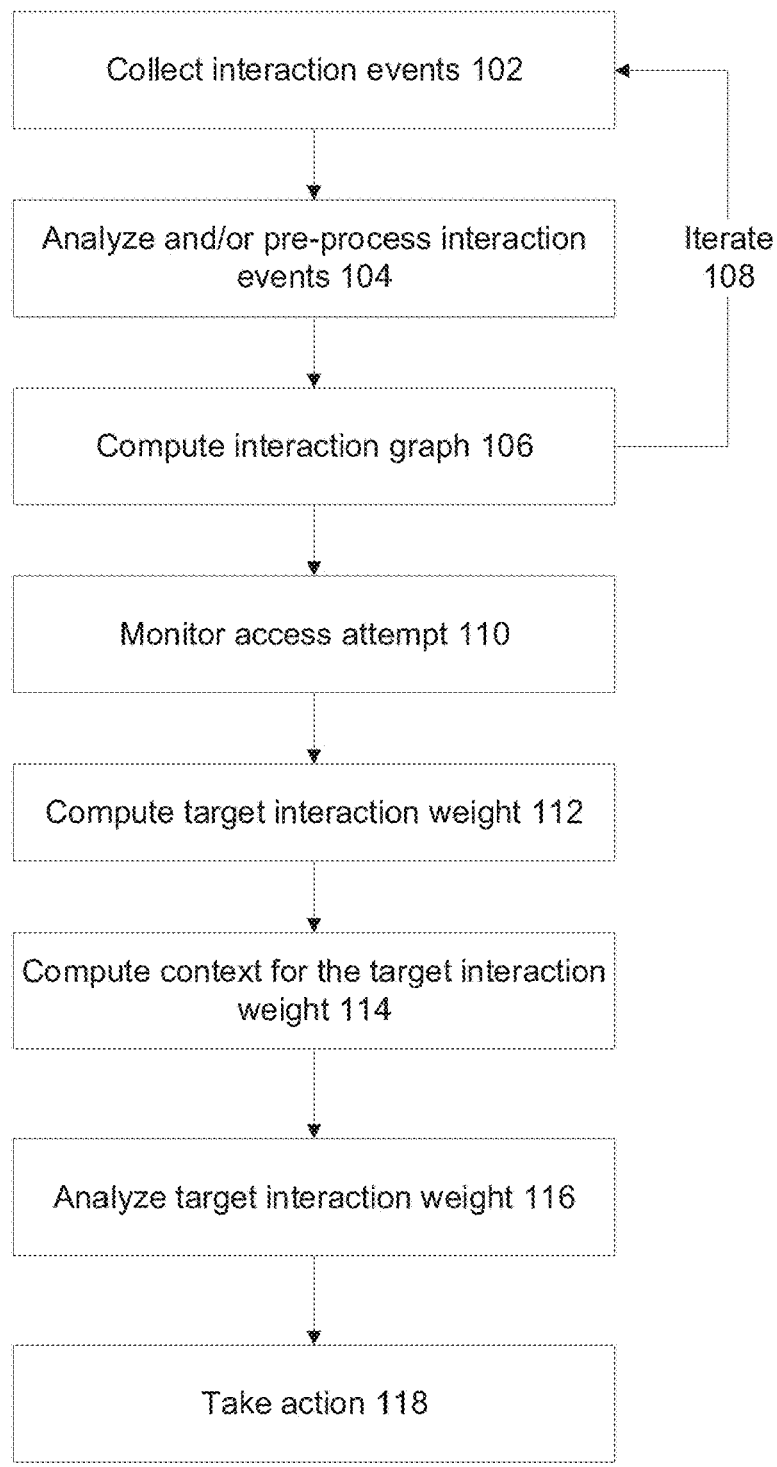
FIG. 1 is a flowchart of a method of securing files and/or records according to interaction weights of an interaction graph, in accordance with some embodiments of the present invention.

The present invention, in some embodiments thereof, relates to access control and, more specifically, but not exclusively, to systems and methods for controlling user access to files.

An aspect of some embodiments of the present invention relates to systems, methods, an apparatus, and/or code instructions (e.g., stored on a memory and executable by one or more hardware processors) for securing files and/or records from access by a target user. An interaction graph is computed by collecting interaction events between users, and between users and files and/or records. The interaction graph is computed using a self-supervised and/or non-supervised approach, without requiring ground truth labelling, such as manual human labels generated for supervised approaches. The interaction graph is computed according to an analysis of the interaction events, for example, aggregating interactions of different sub-categories into categories, replacing multiple triplets of edge-node-edge with a single edge, normalization of the data, and/or eliminating duplicates. A respective node of the interaction graph represents a specific user, a specific record, or a specific file. A respective edge of the interaction graph indicates an interaction between respective users or between a respective user and a respective file or a respective record. An interaction weight assigned to the respective edge indicates an amount of the interaction. An attempt by a target user to access a target file and/or a target record is monitored. A target interaction weight is computed between the target user and the target file and/or the target record from the interaction graph. In response to the target interaction weight being below a target threshold, an action is taken. An exemplary action includes filtering security alerts, where alerts that correspond to the target user and the target file and/or target record are flagged, indicating that the alert is more likely real. Alerts that do not correspond to the target user and the target file and/or target record may be ignored, indicating that the alert is false. In another example of an action, access to the target file and/or target record is blocked for the target user.

At least some implementations described herein address the technical problem of securing files and/or records, for example, controlling user access to files. At least some implementations described herein address the technology of automated securing of files and/or records, for example, automated control of user access to files. On the one hand, granting users security clearance (e.g., full access) to files promotes team work on the files, for example, including other users which are not part of an organization. Different users may collaborate together on the file. On the other hand, lowering securing (e.g., enabling unrestricted access) to the files and/or records opens the door for malicious activity, such as unauthorized distribution of the file, stealing of intellectual property and other organization secrets, and/or opening a door for attacks on data. At least some implementations described herein address the technical problem, and/or improve the technology, by dynamically computing a graph of interactions between users and other users, and/or between users and files, and dynamically granting a specific user access to a specific file and/or dynamically blocking the specific user from accessing the specific file. The access of the specific user to the specific user is dynamically determined based on current interactions patterns, which may indicate, for example, whether the user requires access to the file, such as whether the user is interacting with other users that are accessing the file and therefore the user also requires access to the file. Unauthorized access to the file may be blocked, for example, when the user distributes a file to a friend which is not part of the organization, access by the friend to the file is blocked.

The technical problem and/or technology of securing files and/or records, for which at least some embodiments described herein provide a solution and/or improvement to the technology, optionally automatically, may related to one of more of:

Security—Alert decluttering—for example, data leakage prevention (DLP)). For each incident, the context (e.g., business context) of the action (for example file access/download) may be determined (e.g., interpretability) as described herein and/or the access may be determined to be legitimate or not as described herein. The number of false alerts may be significantly reduced using at least some implementations described herein.

Security—reduce risk by identifying a unique kind of alert—actions without any context (e.g., business context) may be found as described herein, and therefore malicious actions by an insider or other malicious activity may be identified. These actions may be identified using available anomaly detection approaches.

Security—IR (Incident Respond)—upon a security event, related actions and/or context (e.g., business context) may be provided as described herein to significantly reduce the TTR (time to respond).

Information technology (IT)—Access request (authorization management)—upon a user's request to get access, whether the user has business justification may be determined as described herein, the context to approve may be provided to IT (e.g., to an administrator).

IT—least privilege access—when a user no longer has business justification for the access may be determined as described herein, and IT may be provided the context to remove permissions.

Other—information retrieval—for any user who wishes to find other business interactions which are related to the specific action.

At least some implementations described herein address the technical problem of dynamically creating and/or updating a graph of interactions between users and other users, and/or between users and files, which is used to determine whether a specific user is to be granted access to, or blocked from, accessing a specific file. At least some implementations described herein improve the technology of dynamically creating and/or updating the graph of interactions between users and/or files. At least some implementations described herein address the technical problem, and/or improve the technology, by an unsupervised, and/or self-supervised approach, where weights assigned to edges of the graph and/or other hyperparameters (e.g., decay parameters, relationship between weights of edges that are split and/or edges that are aggregated) are dynamically learned, for example, by evaluation of interaction of users and/or files (and/or records. The weights and/or hyperparameters, which are automatically learned, may serve as ground truth labels for training a machine learning model, for example, a graph neural network. In at least some implementations, no ground truth labels are manually provided by users.

At least some implementations described herein address the technical problem of interpretability of an automated security process that secures access to files and/or records, for example, automatically controls access (i.e., grants and/or blocks) to specific files and/or records by specific users. At least some implementations described herein improve the technology of automated security of files and/or records, for example, automated control of access to specific files by specific users. At least some implementations described herein address the technical problem, and/or improve the technology, by providing the basis for the security, for example, for an access control decision. The security may be determined (e.g., access control decision may be made)

based on a computed weight for an edge connecting the specific user with the specific file. The interpretability of the security (e.g., decision) may be based on providing the basis for the computation of the weight used to determine the security (e.g., access), for example, most significant sub-weights which were aggregated to obtain the weight, such as most significant interactions associated with the most significant sub-weights. The interpretability of the security (e.g., decision) may be used, for example, by an administrator evaluating blocked file accesses, to determine whether the blocked user is performing malicious activity such as sending emails to different users in an attempt to appear to interact with the different users in order to gain access to a file which the different users are working on.

With the increased number of incidents that concerned data/assets access and the transition to software as a service (SaaS) Apps, it is difficult or even impossible to understand the context behind them. Furthermore, there is friction between the willingness to secure the organization with the business that wants to run forward. So in order to simultaneously secure the organization's data and let the organization run least-privilege access requires enforcement.

At least some implementations described herein provide large-scale implementation for Business Context Justification (BCJ), which provides the business context behind specific file access actions, and/or legitimacy score. Potential advantages include:
1. Alert decluttering—reduce dramatically the number of incidents
2. Trigger incidents of risky access (without BCJ)
3. Least privilege access/Authorization
   a. Revoke access
   b. Access recommendations (e.g. after turning off link sharing)

At least some implementations described herein provide, for (e.g., suspicious/risky) user's action (and/or sharing/permission change) a justification (e.g. business justification) based on these main questions:
1. Are the specific action (for example, file access) and the permissions that this action used comply with a profile of the user (e.g., required to fulfill the user's job)?
2. Did the user have justification (e.g. business justification) in the past?

At least some implementations described herein address one or more of the following questions:
1. Is there any task or process (e.g., business process) that supports the user's activity?
2. Which are the main contributors of the file? (e.g., start with the ones who have justification)
3. Are there any interactions with other employees/users (e.g., who have business justification) which support the user's activity?

At least some implementations are based on one or more of the following assumptions:
1. Contributors are defined as users which did one of the following actions: creation, upload, editing, commenting.
2. In an organization, every access is preceded with related interactions, specifically with the asset's contributors.

There are different angles to the problem of justification (e.g., business justification). On the one hand, this task may be considered as a recommendation task. However, as discussed herein, recommendation tasks are different approaches than the graph based approach described herein. For example:

Given an open-accessed file, the goal is to close the access (e.g. link sharing) and open the access only for users who have a justification. In the language of the technology of recommendation processes, given a file, retrieve the most related users/groups.

Given a risky action (e.g., download, print, etc.), the problem may be considered as a more-specific recommendation problem because the specific user and specific file are already known (i.e., a 1 vs 1 problem instead of a 1 vs N problem). Because the action already happened, remember to exclude it from the input, otherwise, nothing is done. In the case of a pure user< >item recommendation, remove all the links between the user and the file.

There are different types of recommendations tasks that are differed by their input. For example, the user-item interactions-based recommendation (e.g., in at least some implementations, item=asset/file) which receives a users< >items matrix as input. User-item interactions based recommendation systems may be viewed as bipartite graphs of users< >items. Some related problems: product recommendations on online shopping sites, recommendations on a website for software development, movie recommendations (which is based only on the attendance history and not on reviews, the last is a content-based recommendation task).

In contrast, in at least some implementations described herein, a graph with interactions between users is computed. The graph is different than social network graphs and/or product recommendations. In contrast to social networks or product recommendations, the graph captures interactions between users/employees on the files themselves (e.g., edit, comment, etc.). The graph may capture file actions in a directed manner, between a user and the file, and between the file and the user.

Some exemplary characteristics of justification (e.g., business justification) for a specific user to access a specific file, that are provided by at least some implementations described herein, include:
1. The dynamics of justification—when a user had a justification previously, it doesn't necessarily mean that the user still has it (in the worth case scenario, even when the user themselves created the file). Furthermore, when checking access, the check may include what has happened before, and/or the check may include whether the user had justification when the user initially received the access (e.g., the file sharing itself). At least some implementations described herein dynamically evaluate justification, by considering previous and/or current justifications.
2. Different types of actions and interactions, which also affect the justification analysis. For example, for a given time-span the file creator has a justification by definition. Edit/comment are actions that both contribute and are very visible (e.g., to everyone) vs. view/download/print which only consume data and most of the time don't leave any track. At least some implementations described herein consider the different types of actions and/or interactions.
3. Not every connection in the graph is relevant. At least some implementations described use natural language processing (NLP) approaches to take advantage of meta-data such as file names, event titles, email headers, etc.

Exemplary differences between at least some implementations described herein that use a computed graph to control user file access, and existing recommendation systems, are now described:

1. Personalized recommendations and more specifically personalized-PageRank are some of the most common recommendation algorithms. First, the difference from regular recommendations is described. In the personalized ranking, there is a context and the context is the user. A subgraph of the user is analyzed to get the most related recommendations. As such, there is a bias towards the specific user. If a user for example views a file about recruitment, the personalized mechanism we will recommend other related documents. What standard recommendation systems miss, which at least some implementations described herein consider, is the fact that this specific file has been accessed by all the users in the company (i.e., so this file is not so unique). Moreover, the inherent biased of personalized recommendations may generate erroneous results. For example, if both the user and the creator of the file accessed lots of public documents it may seem like the user has a justification, even when the user does not have justification. At least some implementations described herein evaluate interactions between users and/or files, which correctly determines justification, in a manner that is different than recommendation systems.

2. Another difference from recommendation systems is the specific cases when the user already accessed the file in the past (and/or in the future). In many cases, the suspect had justification in the past but re-validation is needed. Standard approaches would grant access based on past accesses. At least some implementations described herein dynamically re-evaluate the interactions to dynamically determine access, and may block access even when access has been granted in the past.

At least some implementations described herein are based on self-supervised and/or unsupervised approaches. In other words, there is not necessarily a need for user-defined labels. At least some implementations described herein are based on the history of interaction (e.g., in the organization), and the assumption that (e.g., in an organization) every access is preceded by related interactions. Therefore the outcome of at least some implementations described herein is a score and/or an explainability for the context (e.g., business context) concerning a user's action.

The target interaction weight may be a score assigned to an action performed by a user, indicating how much the action is relevant to a specific workflow and/or process (e.g., in an organization).

At least some implementations described herein correlate employees/customers/vendors interaction with a specific business action to derive whether the action has business justification, and may provide explainability by finding the most related interactions (e.g., an email, a meeting, file activity).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
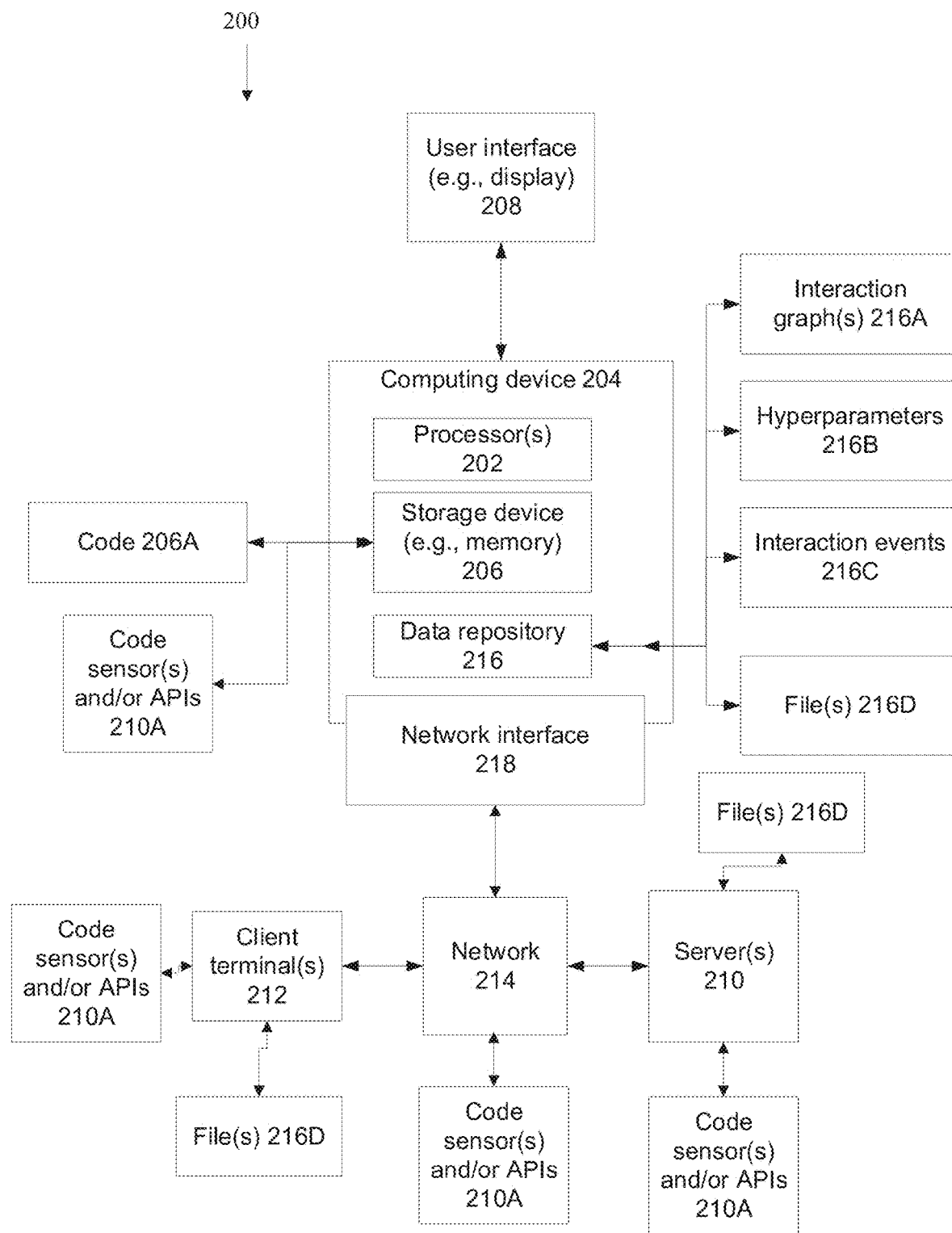
FIG. 2 is a block diagram of a system of securing files and/or records according to interaction weights of an interaction graph, in accordance with some embodiments of the present invention.

Reference is now made to FIG. 1, which is a flowchart of a method of securing files and/or records according to interaction weights of an interaction graph, in accordance with some embodiments of the present invention. Reference is also made to FIG. 2, which is a block diagram of a system 200 of securing files and/or records according to interaction weights of an interaction graph, in accordance with some embodiments of the present invention.

System 200 may implement the acts of the method described with reference to FIGS. 1 and 3-13, by processor(s) 202 of a computing device 204 executing code instructions 206A stored in a storage device 206 (also referred to as a memory and/or program store).

Computing device 204 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 200 based on computing device 204 may be implemented. In an exemplary implementation, computing device 204 storing code 206A may be implemented as one or more servers (e.g., network server, web server, a computing cloud, a virtual server) that provides centralized services (e.g., one or more of the acts described with reference to FIGS. 1 and 3-13) to one or more client terminals 212 and/or server(s) 210 over a network 214, for example, providing software as a service (SaaS) to the client terminal(s) 212 and/or server(s) 210, providing software services accessible using a software interface (e.g., application programming interface (API), software development kit (SDK)), providing an application for local download to the client terminal(s) 212 and/or server(s) 210, and/or providing functions using a remote access session to the client terminals 212 and/or server(s) 210, such as through a web browser. For example, computing device 204 centrally monitors interactions between multiple users that use their respective client terminals 212 to access file(s) 216D stored on different locations, for example, on client terminal(s) 212 of the same and/or different users, on server(s) 210, and/or on computing device 204. Computing device centrally computes and/or updates interaction graph 216A (e.g., as described herein), and centrally blocks access by specific users to specific file(s) 216D and/or centrally grants access to specific users to access specific file(s) 216D.

In another exemplary implementation, computing device 204 provides local and/or non-centralized services to users of computing device 204. Computing device 204 may include locally stored software (e.g., code 206A) that performs one or more of the acts described with reference to FIGS. 1 and 3-13, for example, as a self-contained client terminal that is designed to be used by users of the client terminal. In such implementation, computing device 204 grants access and/or denies access to file(s) 216D which may be locally stored on computing device 204 to users that use computing device 204.

In another example, each client terminals 212 may obtain their interaction graph 216A, which may be customized for each specific user, from computing device 204 (which may compute and/or update interaction graph 216A as described herein) for local installation and use. For example, a central interaction graph is computed based on interactions of multiple different users, and reduced to a respective personalized interaction graph for each specific user. Each client terminal 212 may store its own custom interaction graph 216A for local use, for example, to grant access and/or deny access to file(s) 216D by the specific user(s) of the respective client terminal 212.

Interaction graph 216A is created by analyzing interaction events, which may be stored in an interaction event repository 216C. A hyperparameter repository may store hyperparameters used for computation of interaction graph 216A, as described herein.

Interaction events which are used to compute interaction graph 216A may be collected, for example, by code sensor(s) and/or application programming interfaces (APIs) and/or other virtual interfaces, which may be installed, for example, on computing device 204, on a network 214, on server(s) 210, on client terminal(s) 212, and on other devices and/or applications.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIGS. 1 and 3-13 when executed by processor(s) 202.

Computing device 204 may include a data repository 216 for storing data, for example one or more of: interaction graph(s) 216A, hyperparameter repository 216B, interaction event repository 216C, and/or files 216D. Data repository 216 may be implemented as, for example, a memory, a local hard-drive, virtual storage, a removable storage unit, an optical disk, a storage device, and/or as a remote server and/or computing cloud (e.g., accessed using a network connection).

Network 214 may be implemented as, for example, the internet, a local area network, a virtual private network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect using network 214 (or another communication channel, such as through a direct link (e.g., cable, wireless) and/or indirect link (e.g., via an intermediary computing unit such as a server, and/or via a storage device) with one or more of:

Server(s) 210 which store file(s) 216D that are accessed by users and/or which store code sensor(s) and/or API 210A which monitor interaction events.

Client terminal(s) 212, which may be used by users accessing file(s) 216D (e.g., stored at different locations), and/or which may include code sensor(s) and/or API 210A which monitor interaction events.

Computing device 204 and/or client terminal(s) 212 include and/or are in communication with one or more physical user interfaces 208 that include a mechanism for a user to enter data and/or view data (e.g., read and/or edit files, interact with other users). Exemplary user interfaces 208 include, for example, one or more of, a touchscreen, a display, a keyboard, a mouse, and voice activated software using speakers and microphone.

Referring now back to FIG. 1, at 102, multiple interaction events between users are collected. Alternatively or additionally, multiple interaction events between users and between files and/or records are collected. Interaction with files may relate to a user accessing the actual code of the file, for example, opening a file, reading a file, and editing a file. Interaction with records may relate to a user accessing an instance of data without necessarily accessing the code itself, for example, a user uses an online interface to search a database for a certain record.

The interaction events may be obtained from multiple data sensors and/or multiple interfaces (e.g., application programming interfaces (APIs)) that monitor user interactions, for example, monitor interactions over a network and/or within interaction applications.

Examples of interaction events include: participating in an online meeting, organizing the online meeting, accessing a calendar event, sending email, receiving email, reading a file, sharing a file, creating a file, editing a file, accessing a record, reading a record, sharing a record, creating a record, and editing a record.

Examples of combinations (which may be used to create additional larger combinations) of data sources (e.g., APIs) from which interaction events may be obtained include (where each "email", "calendar" and other source represents one or more possible source such as different email applications by different vendors): Email+Calendar, Instance Messaging+Calendar, Email+Online Meeting, Instance Messaging+Online Meeting, Email+File sharing, Instance Messaging+File sharing, Calendar+File sharing, and Online Meeting+File sharing.

Table 1 below depicts an example of interaction events that are extracted for an online meeting between uses:

TABLE 1

| field | example | remarks |
|---|---|---|
| Calendar Event Id | 043e3qv1s6518uuhn0tehdra75 | unique calendar id |
| Conference ID | qAflPCxRczc4u4mh20B9AKII | unique conference ID - even when a meeting is recurrent |
| Date | 8 Oct. 2020, 22:16:21 GMT+3 | similar format for few dates in G-suit |
| Event Name | Endpoint left | one value only (in the logs seen) every time that a participant exited from the meeting |
| Event Description | The endpoint left a video meeting | one value only (in the logs seen). |
| Duration | 3129 | in seconds |
| Meeting Code | DFHCSQWMFQ | Recurrent meetings have the same meeting code |
| Participant Identifier | tal@recolabs.ai | |
| Organizer Email | gal@recolabs.ai | |
| Product Type | Google Meet rare: Classic Hangouts | |
| Participant Name | Tal Shapira | |
| IP Address | 109.66.203.158 | |
| City | New York | |
| Country | US | |

At 104, the interaction events are analyzed and/or pre-processed.

Optionally, the interaction events are normalized. The normalization is performed to enable aggregating different interaction events together, and/or to enable cross checking the different interaction events.

Optionally, the interaction events are pre-processed and/or normalized by combining data logs from different data sources, to enable computation of the interaction graph. For example, from email addresses mentioned in logs obtained from different data sources, duplicates are removed. Only unique email address is obtained, which serves as a node of the interaction graph. This node is then connected to multiple interaction events related to the unique email address among all the logs.

At 106, the interaction graph is computed according to the analysis of the interaction events. A respective node of the interaction graph represents a specific user or a specific file or a specific record. A respective edge indicates an interaction between respective users, or between a respective user and a respective file or a respective record. An interaction weight assigned to the respective edge indicates an amount of the interaction between the entities corresponding to the nodes connected by the edge. The interaction weight may be a scalar number.

Optionally, the edges are directional. A respective interaction weight may be assigned per directional edge.

The interaction weights may be considered as ground truth labels obtained by an unsupervised approach according to the analysis of the interaction events.

The interaction weights may be computed based on a self-supervised approach. The self-supervised approach may assign weights of edges associated with greater interaction activities weights that are higher than other edges associated with lower interaction activities. For example, interaction weights of edges associated with an interaction type category indicating editing of a file and/or a record may be assigned relatively higher weights than interaction weights of edges associated with an interaction type category indicating viewing of the file and/or record.

Optionally, interaction weights of edges associated with a specific interaction type category selected from multiple interaction type categories are set according to a self-supervised approach. The self-supervised approach may be based on a statistical analysis of the interaction types between files and/or records and/or users, for example, according to an average number of interactions of different types seen per day in the specific deployment environment.

Optionally, a raw initial graph is created from the interaction events. The raw initial graph includes multiple action triplets, where each action triplet denotes an edge-node-edge that connect between a first node and multiple second nodes. Nodes may be converted to edges, using the following exemplary approach: Respective action triplets may be converted to multiple active edges indicating active interaction from the first node to each of the second nodes, and to multiple passive edges indicating passive interaction between each pair of the second nodes. The respective interaction weights of each action triplet may be divided to multiple interaction weights assigned to the multiple active edges and the multiple passive edges.

Figure 3:
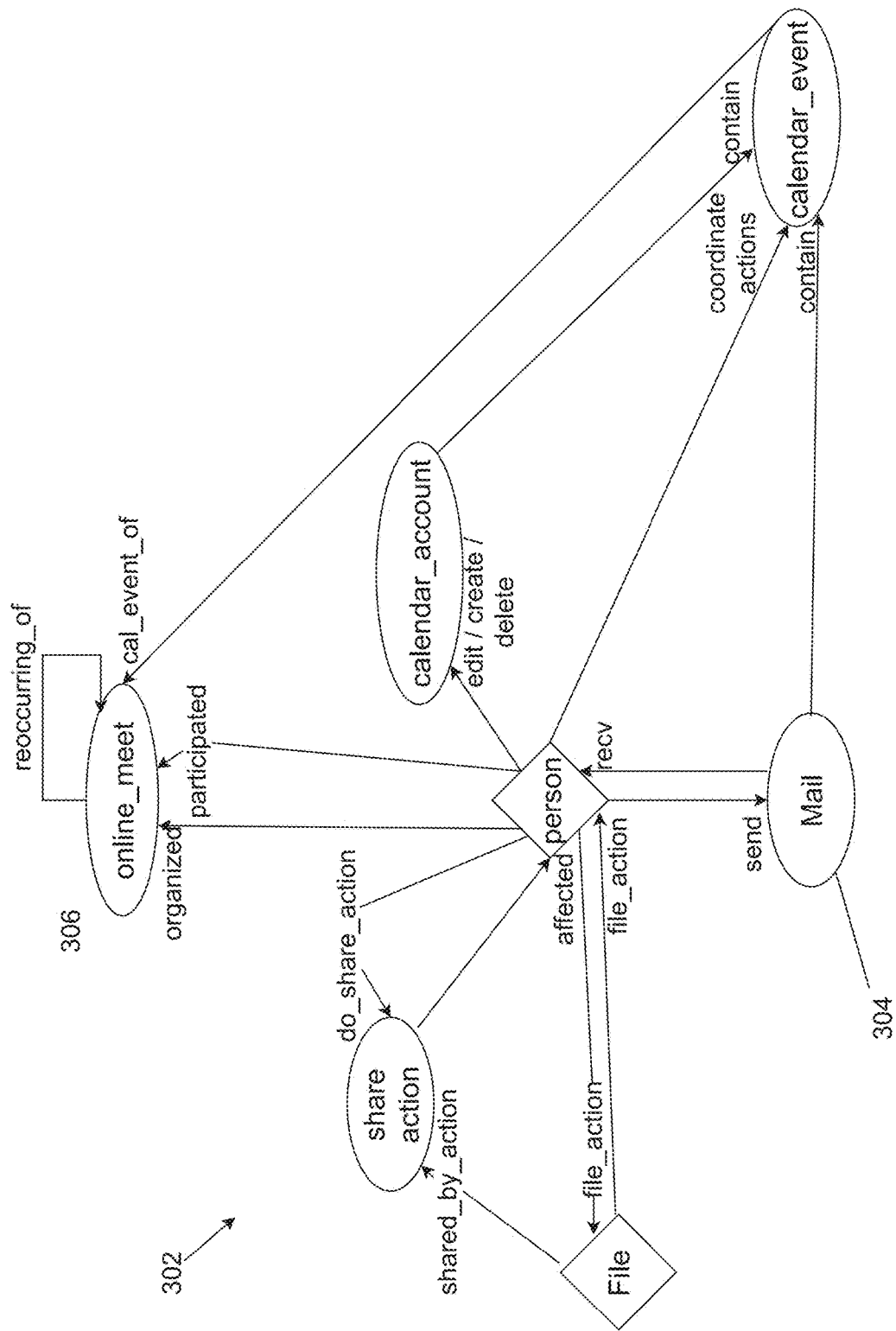
FIG. 3 is a schematic depicting an example of a raw initial graph created from interaction events, in accordance with some embodiments of the present invention.

Reference is now made to FIG. 3, which is a schematic depicting an example of a raw initial graph 302 created from interaction events, in accordance with some embodiments of the present invention. Action nodes, for example, email node 304, is converted to an edge that expresses a connection, for example, "sent_mail", which connects from the user that sent the email to the user that received the email.

In a case where the user sent an email to N users, mail node 304 is replaced with multiple edges including: N edges of 'sent_mail' from the sending user to all the recipients, and $N^2-N$ edges of 'got_mail_together' between all the recipient of the email.

In general, each action node may be replaced with N edges that express active connection (such as 'sent_mail') and ($N^2-N$) edges that express passive relation (e.g., 'got_mail_together').

The weight of the node may be divided (e.g., using an initial weight value of '1') between all the new edges that derived from the node. In the example above, each 'sent_mail' edge is assigned a weight of $1/N$ and every 'got_mail_together' edge is assigned a weight of $1/(N^2-N)$. In general, the weight of the node may be divided between all the new edges from the same kind.

Optionally, the conversion from action triplets to edges is performed, for example, based on a configuration table, a set of rules, a machine learning model, and/or other approaches. An example of a configuration table for changing action triplets that include mail node 304 and online meet 306 is provided below in Table 2.

TABLE 2

| edge - vertex - edge triplet | new_edge |
|---|---|
| received_by, Mail, received_by | got_mail_together |
| sent, Mail, received_by | sent_mail |
| participate, OnlineMeeting, participate | have_meet_together |
| organize, OnlineMeeting, participate | organize_online_meeting_for |

Optionally, multiple edges representing multiple interactions of multiple sub-categories between a first node and a second node, are aggregated into a single edge representing a single interaction of a main category (may also referred to herein as "channels"). The edge may be of different sub-categories, but connect a same source node and a same destination node. The interaction weight for the single edge may be computed by aggregating (e.g., summing, optionally weighted, for example, based on predefined weights, a set of rules, a mathematical equation, and/or a machine learning model) the interaction weights of the multiple edges. A respective single edge connects each pair of nodes.

Examples of main categories (also referred to as channels) include: Email channel, Slack channel, File Action channel, Meeting channels and the like.

For example, for the main category "email", sub-categories include "sent_mail" and "got_mail_together".

An exemplary configuration table defining main categories, sub-categories, and relative weights, is depicted below in Table 3:

TABLE 3

| Channel | edge | weight |
|---|---|---|
| Email | got_mail_togheter | 0.5 |
| Email | sent_mail | 2 |
| Meeting | have_meet_toghether | 1 |
| Meeting | organize_online_meeting_for | 0.5 |

Alternatively or additionally, the multiple-sub categories are the channels, and the main category is indicative of a total interaction. In some implementations, first, multiple sub-categories are aggregated into a channel, and second, the multiple channels are aggregated into a main category indicating the total interaction. An example of aggregation of channels into the main category indicative of total interaction is depicted below in Table 4:

TABLE 4

| Channel | Weight |
|---|---|
| Email | 0.5 |
| Meeting | 3 |
| File Action | 1 |

The weights may be adjustable and/or preset, for example, by a user, by a set of rules, by a mathematical equation, and/or computed by a machine learning model. For example, a meeting may be considered to be much more interactive than an email or a file, and therefore assigned greater weight.

Figure 4A:
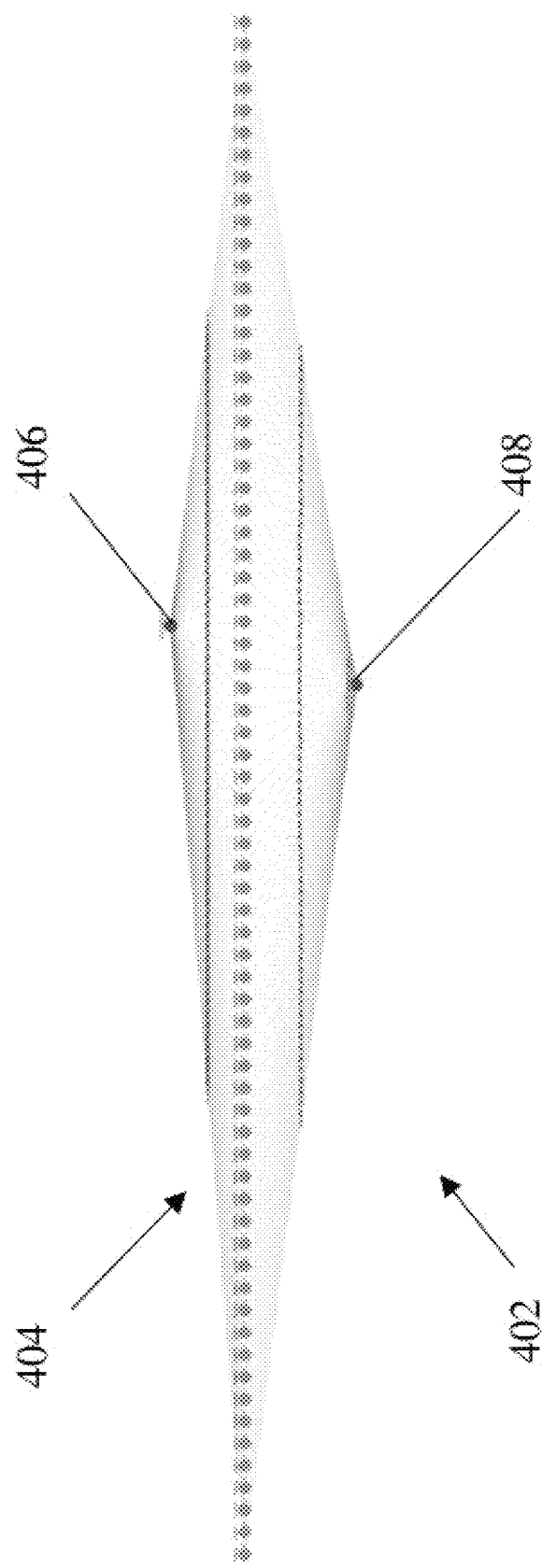
FIGS. 4A-4B include schematics depicting the process of aggregating multiple edges between two nodes, in accordance with some embodiments of the present invention.
Figure 4B:
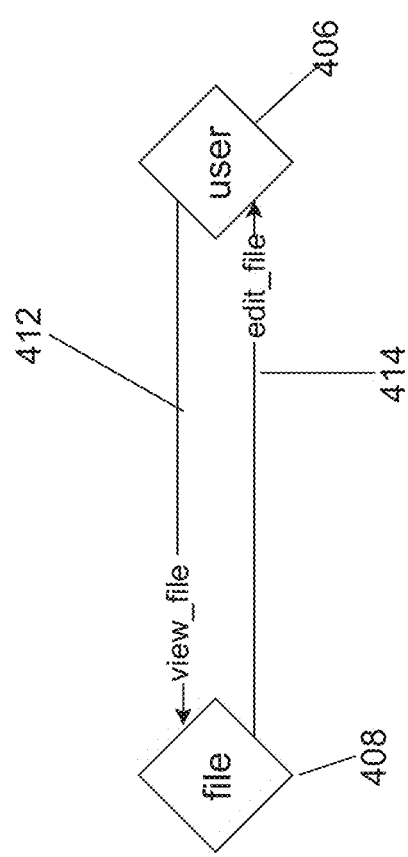

Reference is now made to FIGS. 4A-4B, which include schematics depicting the process of aggregating multiple edges between two nodes, in accordance with some embodiments of the present invention. In FIG. 4A, graph 402 depicts multiple interactions denoted by edges 404 between a user denoted by node 406, and a file denoted by node 408. As visualized, the graph is complex due to the large number of edges.

In FIG. 4B, an aggregated graph is created by aggregating action triplets as described herein, into single edges. A single directed edge 412 between file node 408 and user node 406 and indicates view file denoting the user viewing the file. Another single directed edge 414 between user node 406 and file node 408 indicates edit file denoting the user editing the file. The width of edges 412 and 414 denotes the number of respective views and edits.

Figure 5A:
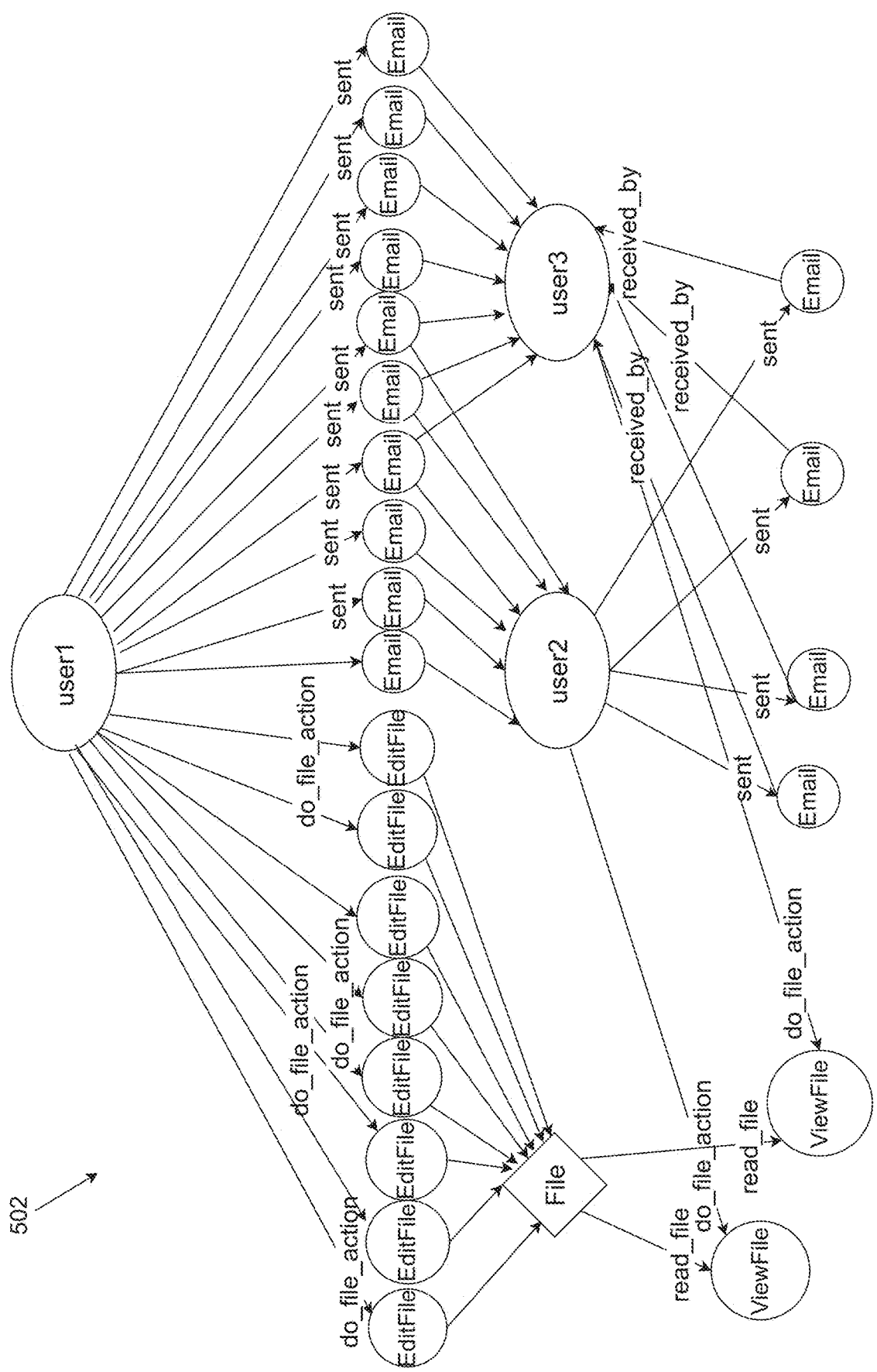
FIGS. 5A-5B are another example of a raw initial graph and an aggregated graph created by aggregating edges, as described herein, in accordance with some embodiments of the present invention.
Figure 5B:
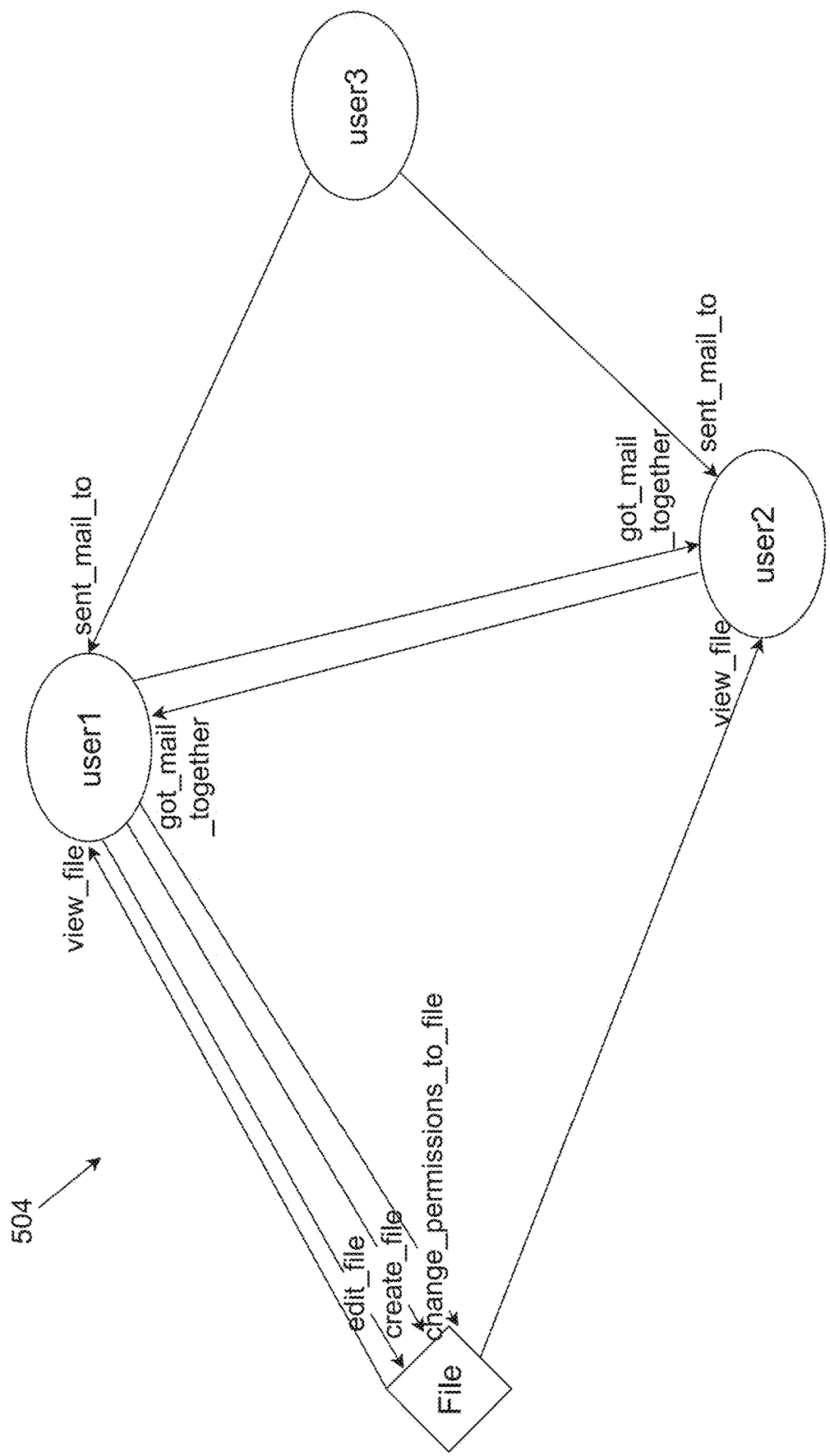

Reference is now made to FIGS. 5A-5B, which are another example of a raw initial graph 502 depicted in FIG. 5A and an aggregated graph 504 depicted in FIG. 5B created by aggregating edges, as described herein, in accordance with some embodiments of the present invention. In FIG. 5A, raw initial graph 502 depicts multiple interactions represented by edges, between different users represented by nodes, and is therefore difficult to analyze due to the large and complex amount of information. In FIG. 5B, aggregated graph 504, which is created by aggregating edges, as described herein, is simpler, makes it easier to understand the different interactions between users.

At 108, features described with reference to 102-106 are iterated. The iterations may be performed, for example, for iteratively updating the interaction graph with new interactions, new users, new files, and/or new records, and/or adjusting the interaction graph to reflect old data that is no longer relevant (e.g., decayed data that is old, users no longer exist, file no longer exists, record no longer exists).

Optionally, the iterations are performed for computing multiple interaction graphs. A graph neural network may be trained on the interaction graphs. In such implementation, the target interaction weight may be obtained (e.g., as in 112) by feeding the target user(s) and/or the target file and/or target record (e.g., of the monitored interaction, as described with reference to 110) into the graph neural network.

At 110, an attempt by a target user to access a target file and/or a target record is monitored. The attempt may be monitored, for example, by analyzing security alerts generated by a security application, and/or by monitoring of collected interactions (e.g., which may be used to generate the graph, as described with reference to 102).

At least some implementations may be based on the main assumption that a justification for the target user to access the target file and/or target record is correlated with active interactions (e.g., active connections) with other users that contribute to the target file and/or target record.

Figure 6:
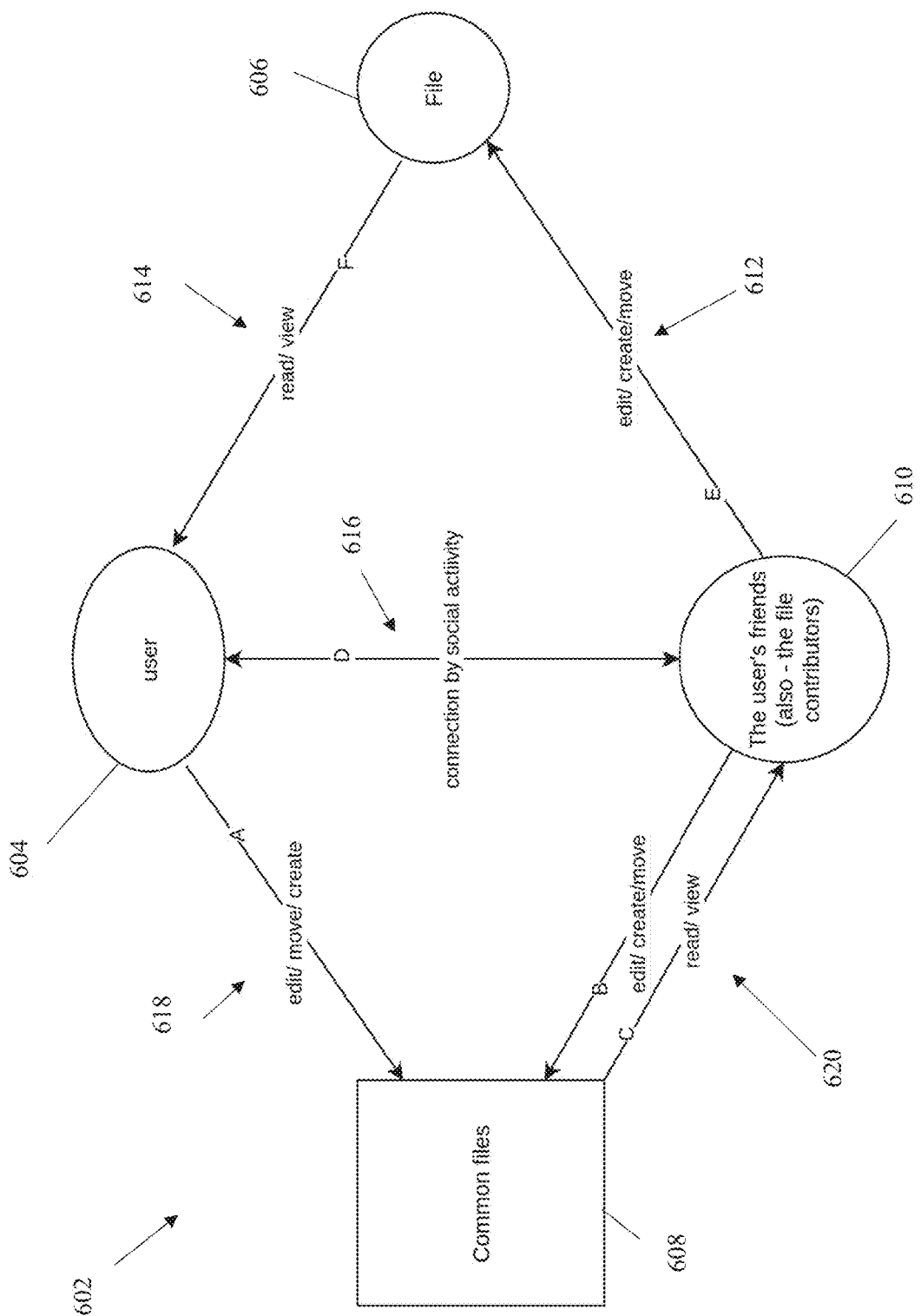
FIG. 6 is an exemplary sub-graph denoting interactions between a user, a file(s) and/or record(s), common files and/or records, and other users which contribute to the files and/or records (also referred to herein as contributors), in accordance with some embodiments of the present invention.

Reference is now made to FIG. 6, which is an exemplary sub-graph 602 denoting interactions between a user 604, a file(s) and/or record(s) 606, common files and/or records 608, and other users which contribute to the files and/or records 610 (also referred to herein as contributors), in accordance with some embodiments of the present invention. Sub-graph 602 is to help understand interactions which contribute to the interaction weights of the interactions graph, for determining whether a target user has justification for touching a target file and/or record, for example, by checking to see whether the target user has sufficient interactions (e.g., connections) with users that contributed to the target file and/or the target record (e.g., as described with reference to 110).

Contributors 610 may be users that contribute to file and/or record 606, by editing, creating, commenting, and/or other write operation performed on file an/or 606, as denoted by edge 612. Optionally, sharing options are not included in the contribution definition. The contribution amount may decay as time passes from the contribution date.

The target interaction weight between the target user and the target file and/or target record may computed as a function of interaction weights between the target user and/or one or more other users having interaction weights (i.e., having an active connection denoted by an edge from a node representing the other user) with the target file and/or target record. I.e., the interaction weight between the target user and the target file and/or target record is computed when there exist in the graph edges with interaction weights between the target user and other users, where the other users also have graph edges with interaction weights with the target file and/or target record. Referring back to FIG. 6, weight for edge 614 between user 604 and target file and/or record 606 is computed when there exist weights for edge(s) 616, which connect between user 604 and other users 610, where other users 610 have edges with weights 612 connecting to target file and/or record 606. Interaction weights of edge 616 denote social interactions, for example, meetings, mailing, slack messages, and/or other recorded direct interaction. It is noted that connection denoted by edge 616 should be active in the perspective of user 604, to avoid cases that a user just sends an email to users 610 to obtain justification for access files and/or record 606. The activity of the edge may be decayed over time to avoid a single event from persisting, and/or certain activities indicating "real" interaction may be assigned higher weights, and/or bi-directional edges may be required to avoid unilateral actions only by the user 604.

Interaction weights between the target user and the other users may be compared to a social connection threshold. Interaction weights between the target user and the other users having values above the social connection threshold may be considered to be significant for computing the target interaction weight. Interaction weights between the target user and the other users having values below the social connection threshold may be ignored in the computation of the target interaction weight.

Alternatively or additionally, the target interaction weight between the target user and the target file and/or target record may computed according to interaction weights between the target user and another file and/or another record, where the another file and/or another record have interaction weights with other user(s), where the other users have interaction weights with the target user. Referring back to FIG. 6, weight for edge 618 between user 604 and common files and/or records 608 is computed when there exist weights for edges 620 between other users 610 and common files 608, where other users 610 are connected to user 604 via weights on edge 616. In other words, the target user contributes to files and/or records that other users touch, optionally all actions except sharing actions.

Interaction weights between the target user and another file and/or another record having interaction weights with other user(s) may be compared to a file connection threshold. Interaction weights between the target user and another file and/or another record having interaction weights with other user(s) having values above the file connection threshold may be considered to be significant for computing the target interaction weight. Interaction weights between the target user and the another file and/or another record (having interaction weights with other user(s)) having values below the file connection threshold may be ignored in the computation of the target interaction weight.

Referring now back to 112 of FIG. 1, a target interaction weight between the target user and the target file and/or the target record is computed from the interaction graph.

One or more features described with reference to 112 of FIG. 1 may be performed in response to receiving the target user and/or the target file, for computing the target interaction weight, for example, according to the specific target user and/or target file, such as normalization. Alternatively or additionally, one or more features described with reference to 112 of FIG. 1 may be performed as part of the process of computing the interaction graph (e.g., as in 106).

Optionally, the target interaction weight is correlated with a normalized value of interaction weights the edge between the target user and other users that contribute to the file (e.g., edge 616 in FIG. 6).

Normalization may be performed according to popularity, i.e., number of other users connected to the target user. This normalization may be performed to avoid giving the same weight to all users and files, without considering popularity. Users that are not so popular (e.g., few connections to other users) will still receive justification for accessing the target file. The interaction weights between the target user and each respective other user may be normalized according to interaction between the respective other user and additional users connected by edges to the respective other user. Normalization based on popularity is performed by normalizing the connection between the target user and other contributing users from the perspective of the other users, i.e., a specific interaction weight (e.g., connection) is computed in comparison to other interaction weights that the other contributing users have.

Alternatively or additionally, the interaction between the target user (e.g., 604 of FIG. 6) and each of other files and/or other records (e.g., 608 of FIG. 6) is normalized according to interaction between the respective another file and/or respective another record and additional users (e.g., contributors, 610 of FIG. 6) connected by edges to the respective another file and/or respective another record. In other words, the connection between a contributor and a file is normalized according to the file, which means that it compares to other connections that the file has.

Normalization may be performed using a hyper parameter, such as a normalization kernel, for example, L1, L0.5, and Llog.

Optionally, interaction weights of the interaction graph according to a decay parameter computed as a function of at least one of: (i) a time from an interaction of the target user with the at least one of target file and target record to a current time of the attempted access, (ii) a time from an interaction of the target user with other users that interacted with the at least one of target file and target record to the current time of the attempted access, and (iii) a time from an interaction of the target user with the at least one of target file and target record to a time from an interaction of the target user with other users that interacted with the at least one of target file and target record.

Optionally, interaction weights of the interaction graph are decayed, optionally adjusted according to a decay parameter. The decay parameter may be computed as a function of one or more of:

(i) A time from an interaction of the target user with the target file and/or target record to a current time of the attempted access by the target user to the target file and/or target record.

(ii) A time from an interaction of the target user with other users that interacted with the target file and/or target record to the current time of the attempted access. Such interaction weight may be assigned a relatively lower value than other interaction weights.

(iii) A time from an interaction of the target user with the target file and/or target record to a time from an interaction of the target user with other users that interacted with the target file and/or target record.

Figure 7:
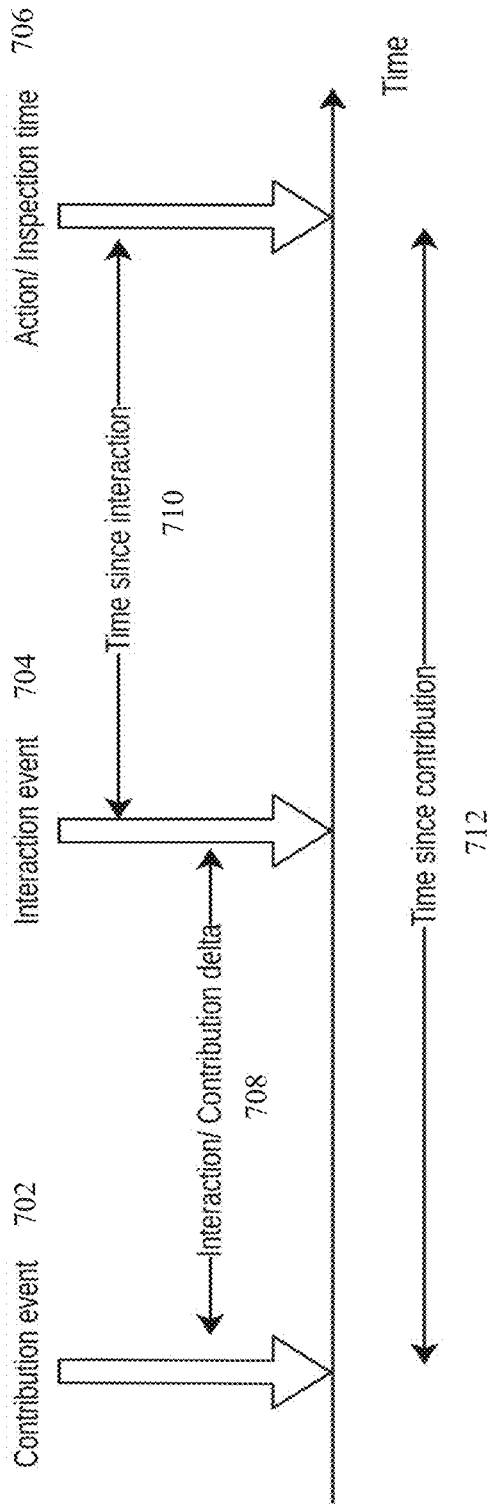
FIG. 7 is a schematic of a timeline for computing a decay parameter, in accordance with some embodiments of the present invention.

Reference is now made to FIG. 7, which is a schematic of a timeline for computing a decay parameter, in accordance with some embodiments of the present invention. The timeline indicates: a contribution event 702 denoting an interaction by the target user with the target file and/or target record, an interaction event 704 denoting an interaction by the target user with other users that interacted with the target file and/or target record, an action/inspection time 706 denoting the attempted access by the target user to the target file and/or target record, an interaction/contribution delate 708 denoting time between 702 and 704, a time since interaction 710 denoting time between 704 and 706, and a time since contribution 712 denoting time between 702 and 706.

Referring now back to 112 of FIG. 1, there may be a difference between a case where the interaction of the target user with the other users (that contribute to the target file and/or record) is before, and the case where the interaction is after, the interaction of the target user with the target file and/or target record (also referred to as contribution). Higher interaction weights and/or a slower decay parameter may be assigned to interaction weights of the "after" case.

Figure 8:
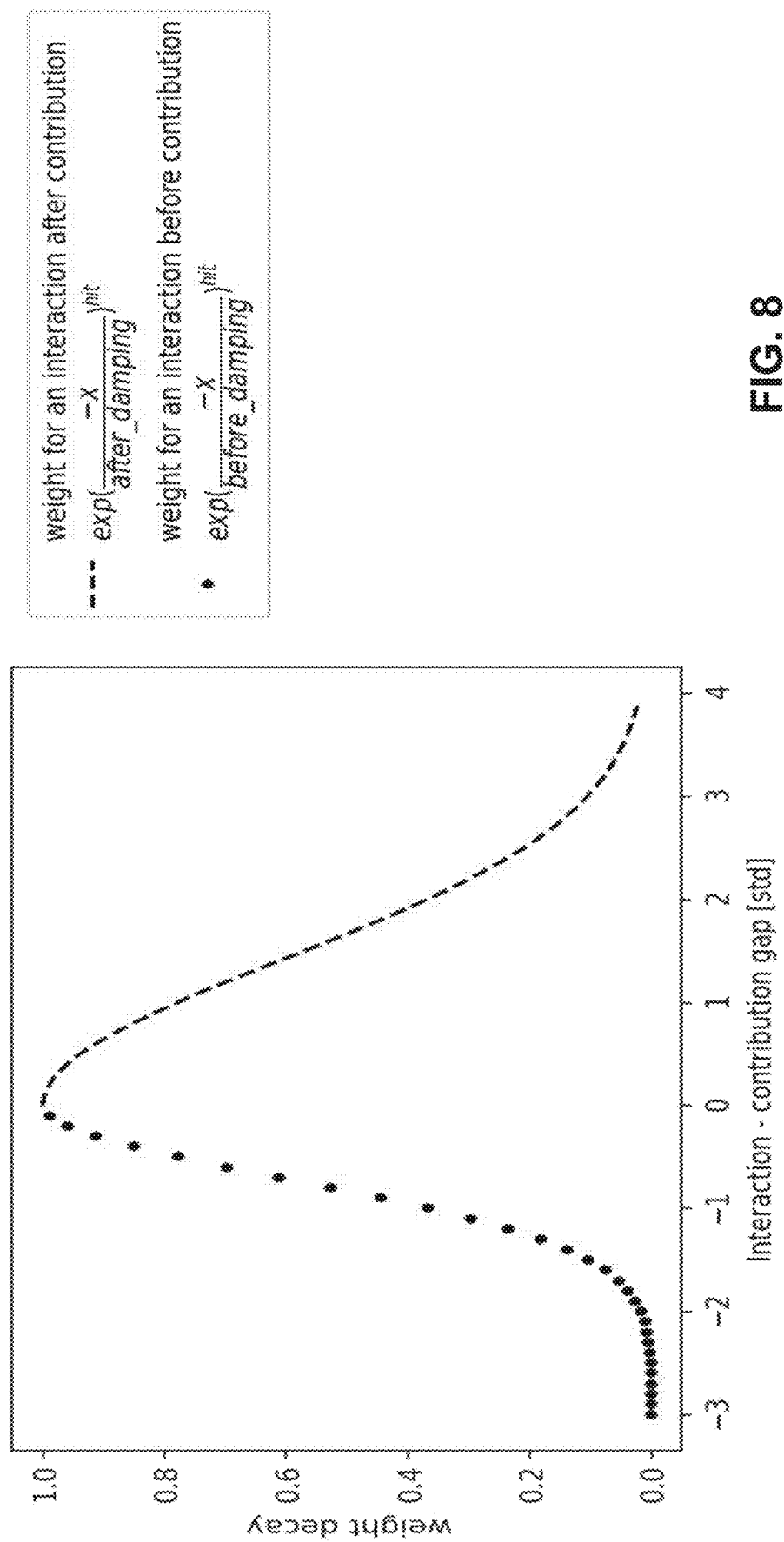
FIG. 8 is a schematic depicting a graph of interaction weight decay as a function of interaction contribution date, in accordance with some embodiments of the invention.

Reference is now made to FIG. 8, which is a schematic depicting a graph of interaction weight decay as a function of interaction contribution date, in accordance with some embodiments of the invention. The interaction weight for interaction after the contribution decays more slowly than the interaction weight of the interaction before the contribution.

Referring now back to 112 of FIG. 1, the time decay may be computed with a time decay core function with the form of: $Exp(-(x/decay\_factor)^k)$, where K denotes the heat parameters that determine how quickly the interaction parameter decays. The hyper parameter may be, for example, 0.5, 1, or 2. The decay_factor may be an individual parameter for each decay type and will set the decay rate. Hyperparameter, may be for example: 90 [days] for contribution decay, 15 [day] for interaction decay, 6 [days] for interaction after contribution, 3 [days] for contribution after interaction. When x==decay_factor, 1/e is obtained as the decay.

The process for computing the interaction graph and/or computing the target interaction weight using the interaction graph described herein may operate under the assumption that all (or most) of the interactions in a specific implementation environment are captured over a certain time interval (e.g., several months). This may be a large amount of data. Processing the large amount of data is technically challenging for several reasons. For example, the full amount of data can't be loaded into the RAM (since it may exceed the RAM maximum capacity). In another example, the calculations using the data need to be done in a distributed way (since otherwise it can take too much time). In another example, it is technically challenging to provide explanations for the results in an efficient manner, without active computations for each specific case.

An exemplary approach for computing the interaction graph and/or computing the target interaction weight using the interaction graph is provided. The exemplary approach is designed to efficiently compute the interaction graph in view of the large amount of data. Additional details are described, for example, with reference to FIG. 9. Data obtained from different data sources is normalized. Duplicates are removed. The interaction graph is split into multiple sub-interaction graphs each created from multiple interaction events collected over a different time interval. For each sub-interaction graph, multiple sub-sub interaction graphs are created. Each respective sub-sub interaction graph is created by aggregating edges and nodes of sub-types of interaction categories into a respective interaction category. For each sub-sub interaction graph, the following are computed: a first dataset of interactions between users, a second dataset of interactions between users and files and/or records, and a third dataset of interactions between users that involve files and/or records. The first dataset, the second dataset, and the third dataset, are normalized. A set of the normalized first dataset, the normalized second dataset, and the normalized third dataset, is for each respective interaction category of multiple interaction categories for each time interval of multiple time intervals. For each set, the target user and the target file and/or target record are selected, to create selected first, second, and third datasets. A user interaction dataset is created by aggregating the first dataset and the second dataset. An interaction dataset is created by aggregating the second dataset and the third dataset. A respective interaction weight is computed for each respective interaction category. The target interaction weight is computed as an aggregation of interactions weights of interaction categories. The respective interaction weight for each respective interaction category may be provided for explainability of the target interaction weight. Optionally, the first dataset and the second dataset are implemented as sparse matrices having a size that is linearly proportional to an amount of interactions.

At 114, context for the outcome of the target interaction weight is computed. The context may indicate an explanation for the computed target interaction weight. The context (e.g., explanation) is provided to help understand how the target interaction weight is computed, for example, to enable an administrator to determine whether the target interaction weight is justified or not.

The context may be obtained by accessing triplet(s) of node-edge-node having a respective sub-interaction weight used to compute the target interaction weight. The interaction weights of the interaction graph may be computed by aggregating sub-weights of sub-graphs. The context for the outcome of the target interaction weight may include one or more of: the triplet(s) and/or corresponding sub-weight, an interaction category, and/or the triplet.

The context may be, for example, presented on a display, and/or used to determine whether the target interaction weight is correct or not.

As used herein, the terms context and explanation may be interchanged.

The explanation may be according to division of interaction categories and/or sub-categories (e.g., channel). Such division may help analyze what where the interactions that contributed to the target interaction weight, for example, components of mailing (e.g., 10%), meeting (50%), and file changes (40%) that contributed to the target interaction weight.

The explanation may be according to time. The time may help analyze when the interaction events that contributed to the target interaction weight occurred, and/or what time decay was assigned.

The context (e.g., explanation) may include one or more of:

Other user(s) connected to the target user.
The interaction weights between the target user and the other user(s).
The other file and/or other record.
The interaction weights between the target user and the other file and/or other record.
One or more interaction type category of the interaction between the target user and the other users.
One or more interaction type category of the interaction between the target user and the other file and/or other record.
A time from an interaction of the target user with the target file and/or target record to a current time of the attempted access.
A time from an interaction of the target user with other users that interacted with the target file and/or target record to the current time of the attempted access.
A time from an interaction of the target user with the target file and/or target record to a time from an interaction of the target user with other users that interacted with the target file and/or target record.

The different contexts may be sorted, for example, by corresponding interaction weights.

It is noted that in some cases, no context is obtained, indicating that the user does not have justification for the access. In such a case, to make sure there is no error, a sub-graph of an ego-view of the target user and another sub-graph of the target file, may be generated and inspected for mutual connections. It may occur that one or both of the sub-graphs are empty (e.g., if there is no connection). However, in other cases, even if the user has no justification, the sub-graph(s) may not be empty, for example, in cases that the target user has a connection with other user that interact with the target file and/or target record but didn't contribute to it.

It is noted that for computation of the interaction graph (e.g., as in 106) and/or the target interaction weight, multiple parameters are defined (e.g., interaction weights, core function parameters, decay parameters, and others). The selection of the parameters affects the target interaction weight. An optimal choice of the parameters may vary between different implementation environments. An automated self-supervised approach and/or non-supervised for setting the parameters may be used, rather than a human providing labels for a supervised approach. The automated self-supervised approach and/or non-supervised enables automated customization for the different implementation environments.

The self-supervised approach may be based on analyzing cases that are known with high certainty that the target user had a justification. The assumption may be that if the target user edited a file, the target user had justification, because editing a file is a load operation and a user that doesn't have a justification to view a file will not edit it. Cases where a user views a file may be examined, and only after editing the file, these cases are assigned a high interpretability weight score compared to cases where the user only views the files. In another example, the parameters of the decay_factor may be set according the average time of interaction (e.g., with external users). In yet another example, the interaction weights between the channels are set according to the statistical used of each channel. In yet another example, the self-supervised approach is based on a set customized policy according to each specific implementation environment.

Optionally, as part of the self-supervised approach, the decay parameter is set according to a statistical distribution of interactions between users and/or files and/or records, for example, including one or more of: other user(s) connected to the target user, the interaction weights between the target user and the other user(s), and the other file and/or other record.

At 116, the target interaction weight is analyzed. The target interaction weight may be analyzed in view of the context.

The target interaction weight may be compared to a target threshold.

Alternatively or additionally, the target interaction weight is analyzed by the following process: a similar user(s) that is similar to the target user is identified. Similar users may be found, for example, by computing a correlation and/or match between records of users, such as between profiles of users. The profiles may include, for example, demographic information (e.g., age, geographical location, income), personal information (e.g., hobbies, occupation) and/or behavior information (e.g., same contacts, frequency accessed files, when login to system occurs, types of file access). A similar file(s) that is similar to the target file, and/or similar record that is similar to the target record, is identified. Similar files may be found, for example, by computing a correlation and/or match between files, for example, types of files, structure of file, location of file, size of file, encoding, and the like. A similar interaction weight is computed for the similar user(s) and the similar file and/or similar record, using the approach described with reference to computing the target interaction weight for the target user and target file and/or target record. When the similar interaction weight is statistically significantly different than the target interaction weight (e.g., by computing a correlation function, when the correlation function is above (or below) a set similarity threshold), the target interaction weight may be set to the similar interaction weight, and/or an error message is generated for further investigation. The difference between the two weights, which are expected to be similar, indicates a problem somewhere.

The comparison with the similar user and/or similar file and/or similar record may be performed, for example, for the following situations: cases that a "contributor" is not a contributor by the definition, even that the user behave like that and/or behave similar to other contributors (e.g., interacts with the same users, work on the same files). Cases that the target user does not have any justification to access the target file and/or target record (e.g., target interaction weight below the threshold), the target user is very similar to other user(s) that do have a justification. Cases that the target user don't have justification to access the target file and/or target record, but does have justification for very similar files. Case that the target user tries to trick the system by sending an email to many other users or performing some artificial operation to get a high amount of justification.

The similarity approach looks at the following: by comparing similarity in contributions between the target user and the similar user. By comparing similarity between the target user and the similar user—when the target user and the similar user behave similarly and have similar connections, there is no real reason to give one of them a high interaction weight and a low interaction weight to the other. By comparing similarity between the target file and the similar file—when the target file and the similar file have similar connections (to users) it may be assumed that the justification for them is similar. When the target user is totally not like other users that touch the file, the target interaction weight may be lower (but the target user may still have a sufficient weight for justification).

Computation of similarity between users may be used to group similar users and/or group similar files. Aggregation may be performed for the unjustified access and/or share justification between them.

Alternatively or additionally, the target interaction weight is analyzed by feeding the target interaction weight and indication of the context into an analysis process, for example, a trained machine learning model that determines whether the target interaction weight in view of the context is correct or not. Such model may be trained using supervised, and/or non-supervised, and/or self-supervised approaches.

At 118, in response to the target interaction weight being below (or above) the target threshold, action may be taken. Examples of actions include:

Filtering security alerts and/or alert decluttering, for example DLP. The security alerts may be generated, for example, by a security monitoring process. Alerts that correspond to the target user and the target file and/or target record may be flagged with a flag indicating that the security alert is real. Alerts that do not correspond to the target user and target file and/or target record may be assumed to be false positives, and ignored. The number of false alerts may be significantly reduced.

Access by the target user to the target file and/or target record may be automatically blocked, for example, by an IT application. For example, the access privileges of the target user are changed, the target user is kicked out of the current application running the target file and/or record, and a connection established by the target user to the target file and/or record is terminated.

Risk may be reduced by identifying a unique kind of alert—actions without any context (e.g., business context) may be found as described herein, and therefore malicious actions by an insider or other malicious activity may be identified. These actions may be identified using available anomaly detection approaches.

Security—IR (Incident Respond)—upon a security event, related actions and/or context (e.g., business context) may be provided (e.g., email, pop-up, notification, alert messages) to significantly reduce the TTR (time to respond).

Information technology (IT)—Access request (authorization management)—upon a user's request to get access, whether the user has business justification may be determined as described herein, the context to approve may be provided to IT (e.g., to an administrator) for example, as an email, pop-up notification, push notification, alert, and the like.

IT—least privilege access—when a user no longer has business justification for the access may be determined as described herein, and IT may be provided the context to remove permissions.

Figure 9:
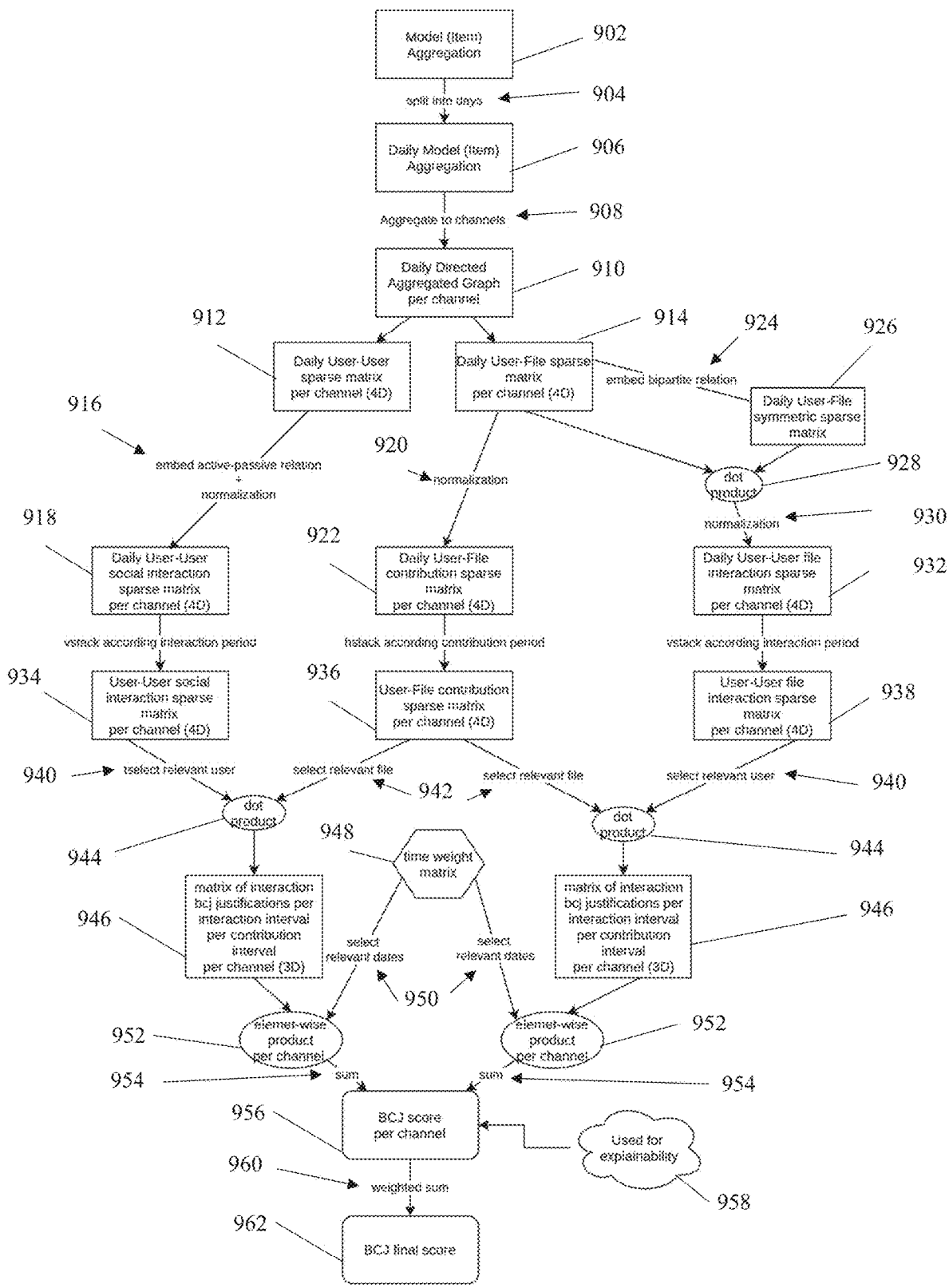
FIG. 9 is a flowchart of an exemplary approach for computing the interaction graph and/or computing the target interaction weight using the interaction graph, in accordance with some embodiments of the present invention.

Reference is now made to FIG. 9, which is a flowchart of an exemplary approach for computing the interaction graph and/or computing the target interaction weight using the interaction graph (e.g., as in 106 and/or 112), in accordance with some embodiments of the present invention. The exemplary approach is designed to efficiently compute the interaction graph in view of the large amount of data.

At 902, model (item) aggregation is performed for collected interaction events. Basic aggregation may be performed at the item level. Normalization may be performed.

At 904, data is split into time intervals, for example, days.

At 906, daily (or other time intervals) model (item) aggregation is performed. Split of the item aggregation into intervals may be performed, where every interval include all the data from that time interval, for example, one day. For example, for T days, T subgraphs are obtained. This step may be done because after the aggregation the temporal information used to compute the target interaction weight may be lost. The split to daily graphs preserve the temporal information.

At 908, the daily data is aggregated into channels.

At 910, a daily directed aggregated graph per channel is computed. Aggregation of the daily item aggregation into aggregation per channel may be performed. For example, for C channels C subgraphs are obtained (i.e., total of T*C subgraphs). This step may be performed in order to get a final number of every connection in the graph.

Following 910, raw daily sparse matrices per channel are computed. This step takes the subgraph, and from every subgraph two matrices of the connections between users to users or users to files are computed.

At 912, a Daily User-User sparse matrix per channel (4D) is computed. This matrix is not a symmetric matrix. Matrix A[i,j] includes the edges values from i to j that may be different from the edges from j to i. The rows of this matrix indicate the active connection between the suspected user (e.g., target user, other user being considered) to all of the contributors (i.e., other users). The columns describe the active connection between the contributors to all of the suspected users.

At 914, a Daily User-File sparse matrix per channel (4D) is computed. There are actually two sparse matrices: one matrix of the edges between the users to the files denoting editing actions, and another matrix of the edges between the users to the files denoting viewing actions. It is noted that using sparse matrices may provide technical advantages over using full matrices, since the size of sparse matrices is linearly proportional the amount of interaction in the daily-subgraph-per channel, in contrast to a full matrix that always have the same size (#User*#Files) which can be huge.

Following 914, a Daily Normalize interaction sparse matrix per channel are computed. This step take the raw connection from the sparse matrix and prepare the following normalized interaction sparse matrices:

At 918, Daily User-User social interaction sparse matrix per channel (4D) is computed, by deriving from the Daily User-User sparse matrix per channel (4D) 912 by embedding the active and passive relation 916 into a final score. The embedding may be computed by taking the active connection (interaction made by the contributor), or some other function that considers mostly at the active connection, but also considers the passive connection. Normalization of the matrix columns which have meaning of normalization according to the contributors side, may be performed.

At 922, Daily User-File contribution sparse matrix per channel (4D) is computed, by deriving by normalization 920 of the Daily User-File sparse matrix per channel (4D) 914. A portion of editing actions are used, and the viewing actions are ignored. The normalization 920 is from the file perspective.

At 932, Daily User-User file interaction sparse matrix per channel (4D) is computed, by deriving from Daily User-File sparse matrix per channel (4D) 914 by embedding 924 of the 'Viewing' and 'Editing' interaction of the user and the file to obtain a Daily User-File symmetric sparse matrix 926. The embedding function may be a sum, and/or a different function such as log(sum( ). The embedding function may be a hyperparameter. A dot product 928 is computed between the Editing matrix 914 and the embedded matrix 926 to get the active connection. Active file touching connection between user_a and user_b is defined to occur when user_a edits the file and user_b edits or views the file. The dot product obtains such connection.

Following 932, to obtain an interaction sparse matrix per channel, the relevant days for contribution and interaction are selected by taking X contribution days before the checking date and Y contribution days before the checking date. X,Y are predefined hyperparameters. This process generates the following 3 matrices (for every day, for every channel): User-User social interaction sparse matrix per channel (4D) 934, User-File contribution sparse matrix per channel (4D) 936, and User-User file interaction sparse matrix per channel (4D) 938.

At 926, matrices of interaction bcj (i.e., interaction weights) justifications per interaction interval per contribution interval per channel are computed. It is noted that this is the first step that cannot be done in the initialization phase, since the relevant target user 940 user and relevant target file 942 are first selected. This selection reduces one dimension in every matrix. At 944 a dot product between the contribution matrix 936 to the interaction matrix (per channel) 934 and 938 is computed, to obtain the following matrices 946 matrix of social interaction bcj justifications per interaction interval per contribution interval per channel (3D), and matrix of file interaction bcj justifications per interaction interval per contribution interval per channel (3D).

At 956, A BCJ score (i.e., interaction weight) is computed per channel. The interaction weight is computed as a weighted sum 954 of the previous matrices 46 for which an element-wise product per channel 952 is computed from a time-weighted matrix 948, for which relevant dates 950 are selected. A respective interaction weight computed per each channel, is used for explainability 958, as described herein.

At 962, a BCJ final score (i.e., target interaction weight) is computed as a weighted sum 960 of score 956. The weighting is according to the channel, and may be considered as a hyperparameter.

Figure 10:
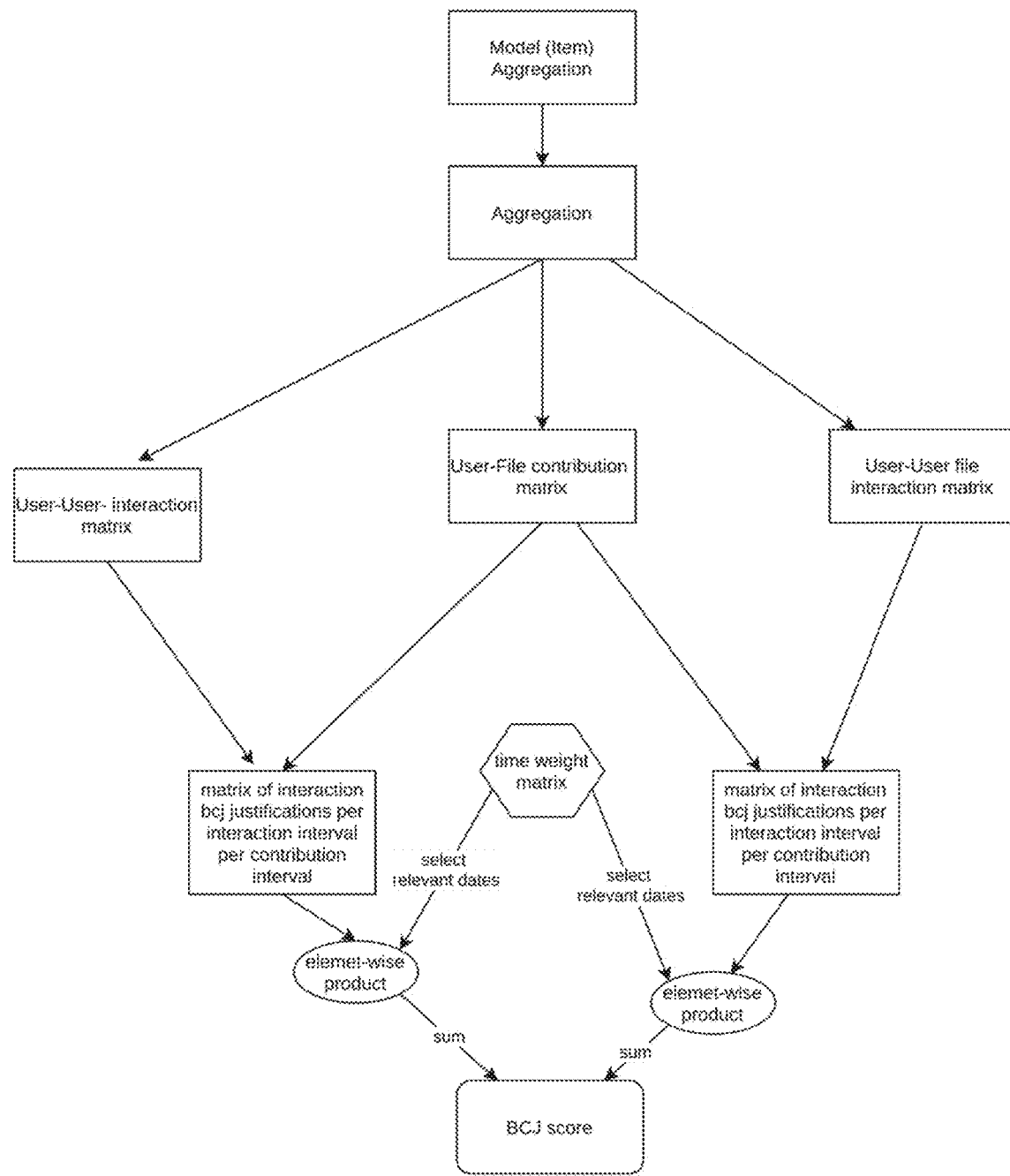
FIG. 10 is a simplified approach based on the approach described with reference to FIG. 9, for a scenario where the amount of data to process does not need to be divided into multiple time intervals and/or into multiple channels, in accordance with some embodiments of the present invention.

Reference is now made to FIG. 10, which is a simplified approach based on the approach described with reference to FIG. 9, for a scenario where the amount of data to process does not need to be divided into multiple time intervals and/or into multiple channels, in accordance with some embodiments of the present invention. Features of FIG. 10 are as described with reference to corresponding features of FIG. 9.

Examples of hypothetical cases where the approach described herein correctly identified target uses that don't have justification (i.e., target interaction weight above the threshold) to access the target file are now described.

In an example, a company employee sent a file to friends to whom the company employee gave a lecture, which were unrelated to the business process. The users received an interaction weight of 0, due to the lack of interactions and actions on files for both users. It is noted that in this specific instance permissions to a file were granted to the users—but those were to a different file than the one presented below, where the users lacked justification. In this example, both @anecdotes.ai users received an interaction score of 0.

Figure 11:
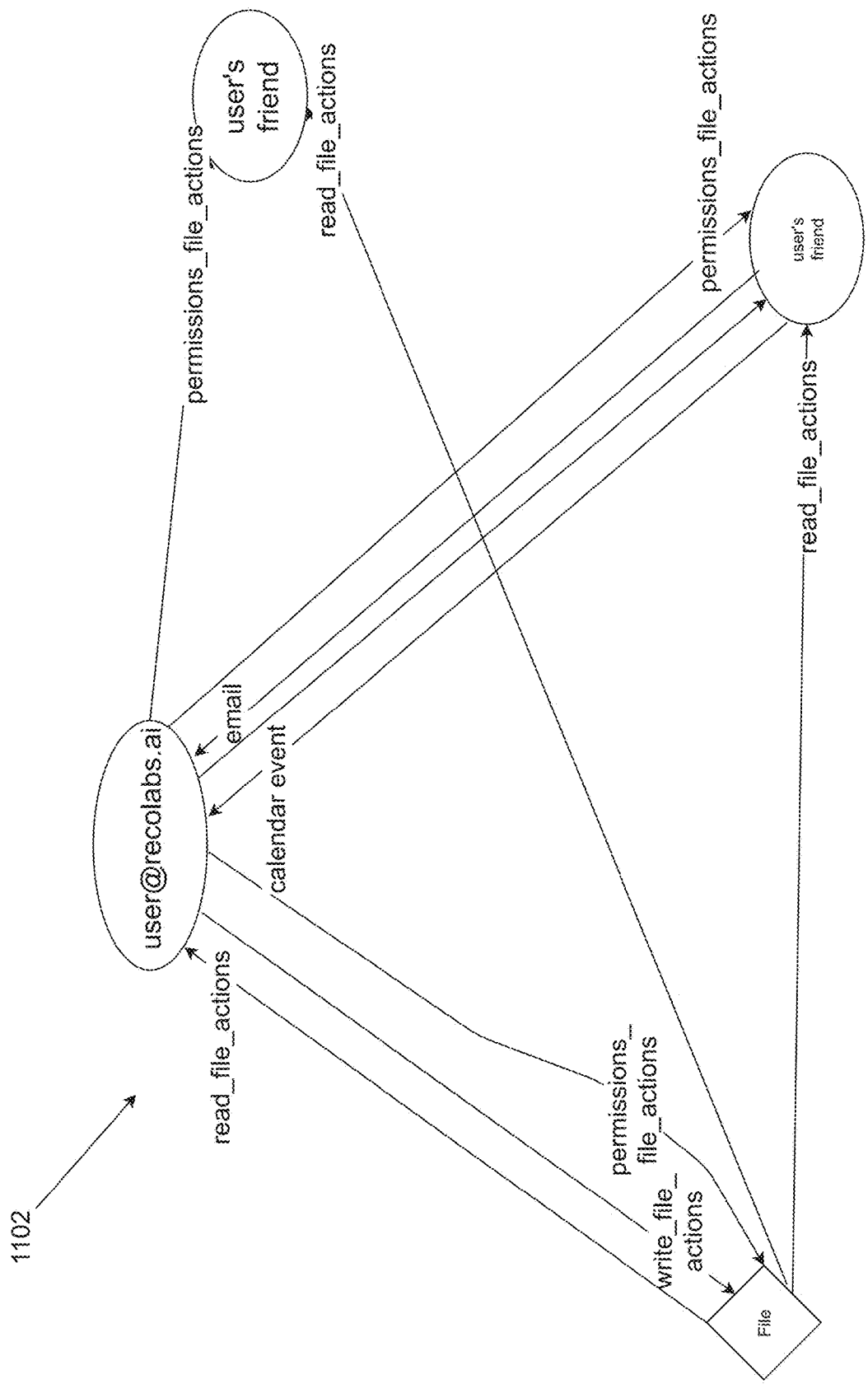
FIG. 11 is an interaction graph that includes very few connections, that visually explains the target interaction score was below the threshold, and therefore no justification to access the target file was granted, in accordance with some embodiments of the present invention.

Reference is now made to FIG. 11, which is an interaction graph 1102 that includes very few connections, that visually explains the target interaction score was below the threshold, and therefore no justification to access the target file was granted, in accordance with some embodiments of the present invention.

Example are now described in which target users that should receive justification to access the target file have been correctly identified by the approach described herein, for example, the target interaction weight is above the threshold.

One example derives from incidents where there is cooperation with other companies that are legitimate. For example, a first company outsources the build of software and is building software for a second company. In this case, even though the target user is a third party user from the first company, the described approach correctly gave justification to the target user because of previous interactions with other legitimate users from the second company.

Figure 12:
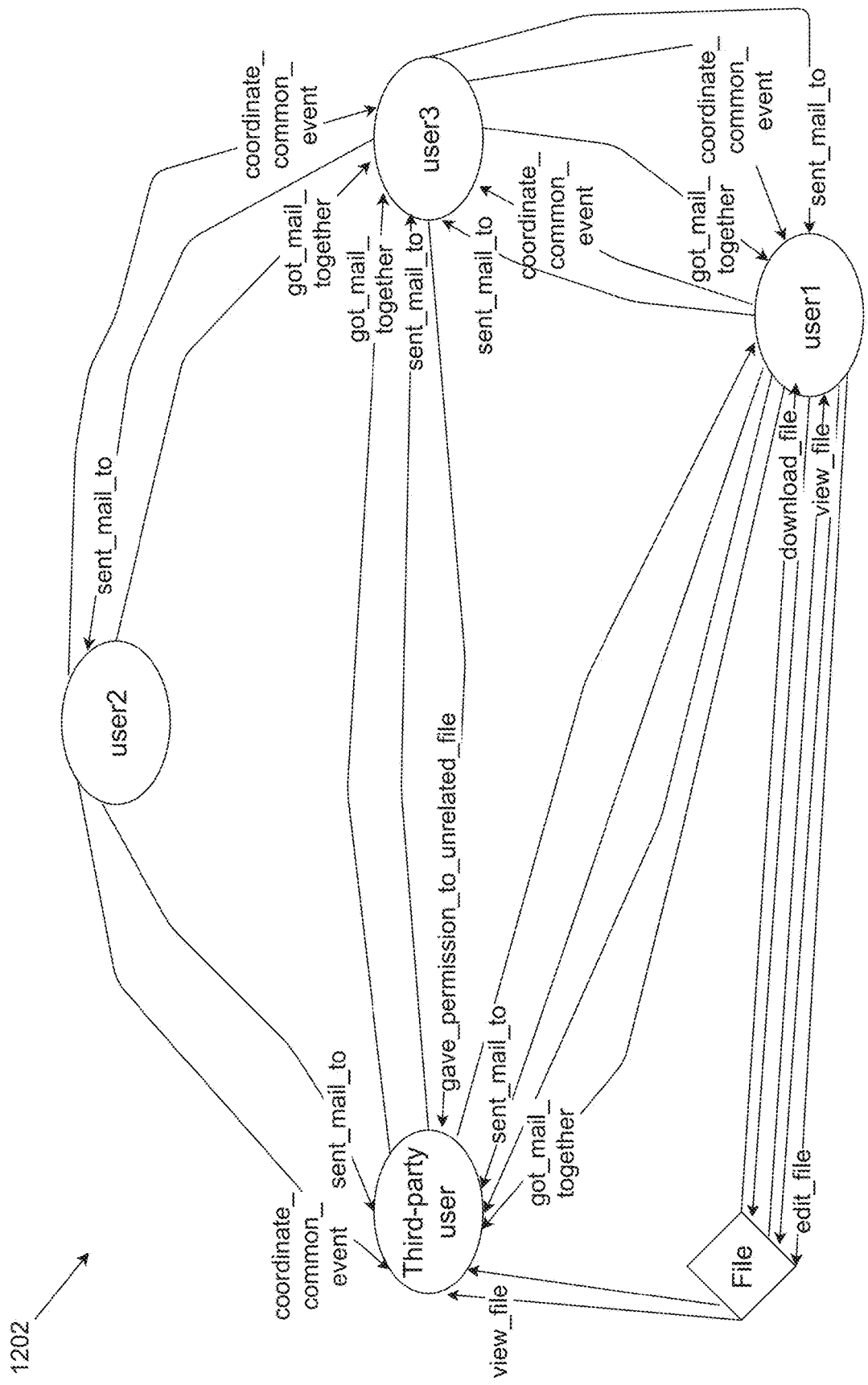
FIG. 12 is an example of an interaction graph where the third party user from the first company received a target interaction weight of 2538, justifying access to the target file of the second company, in accordance with some embodiments of the present invention.

Reference is now made to FIG. 12, which is an example of an interaction graph 1202 where the third party user from the first company (email "bhuvan") received a target interaction weight of 2538, justifying access to the target file of the second company, in accordance with some embodiments of the present invention. Graph 1202 depicts many connections between internal legitimate users of the second company and the third party user of the first company, which provided the basis to grant justification to access the target file by providing the target interaction weight above the threshold.

In another example, justification to access the target file may be provided to internal users that use personal emails to access files. This action, even though it has the potential of being risky, can be legitimate, and should be identified separately than any other access by a personal user.

Figure 13:
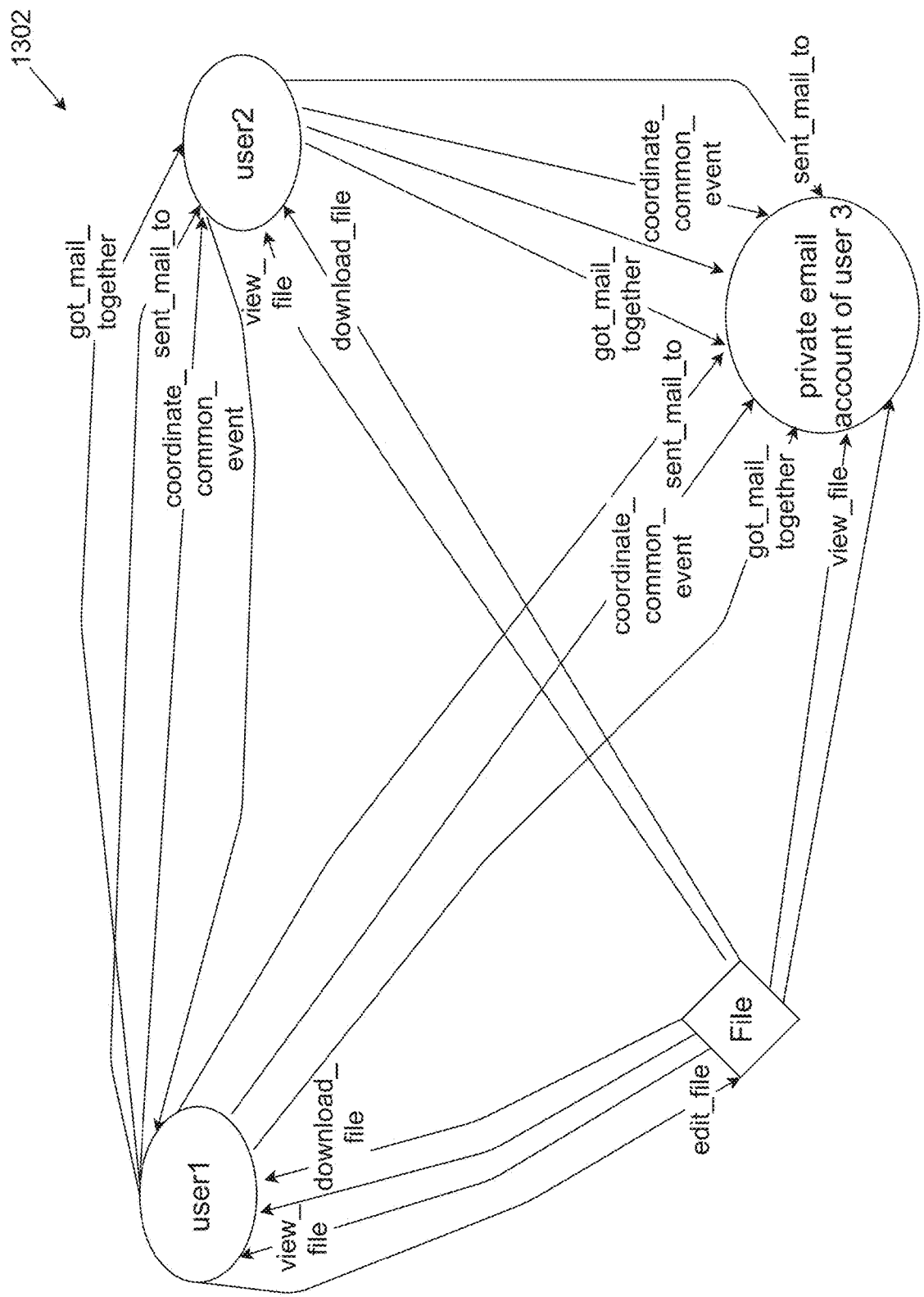
FIG. 13 is an example of an interaction graph where a private email account of user 3, which is a personal email of the target user, received a target interaction weight of 1260, justifying access to the target file of the company, in accordance with some embodiments of the present invention.

Reference is now made to FIG. 13, which is an example of an interaction graph 1302 where a private email account of user 3, which is a personal email of the target user, received a target interaction weight of 1260, justifying access to the target file of the company, in accordance with some embodiments of the present invention. Graph 1302 depicts many connections between internal legitimate users and the personal email of another company employee, which provided the basis to grant justification to access the target file by providing the target interaction weight above the threshold.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant files and/or records will be developed and the scope of the term file and/or record is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method for securing at least one of files and records, comprising:
    creating an interaction graph, by:
        collecting a plurality of interaction events between users and between users and at least one of files and records,
        computing the interaction graph according to an analysis of the plurality of interaction events, by
            normalizing data obtained from different data sources,
            removing duplicates,
            splitting the interaction graph into a plurality of sub-interaction graphs each created from plurality of interaction events collected over a different time interval,
            for each sub-interaction graph, creating a plurality of sub-sub interaction graphs, each respective sub-sub interaction graph created by aggregating edges and nodes of sub-types of interaction categories into a respective interaction category,
            for each sub-sub interaction graph, computing a first dataset of interactions between users, a second dataset of interactions between users and at least one of files and records, and a third dataset of interactions between users that involve at least one of files and records,
            normalizing the first dataset, the second dataset, and the third dataset,
            wherein a set of the normalized first dataset, the normalized second dataset, and the normalized third dataset, is for each respective interaction category of a plurality of interaction categories for each time interval of a plurality of time intervals,
            selecting, for each set, the target user and at least one of target file and target record, to create selected first, second, and third datasets,
            creating a user interaction dataset by aggregating the first dataset and the second dataset,
            creating an interaction dataset by aggregating the second dataset and the third dataset,
            computing a respective interaction weight for each respective interaction category, and
            computing the target interaction weight as an aggregation of a plurality of interactions weights of a plurality of interaction categories,
        wherein a respective node of the interaction graph represents one of a specific user, a specific record, and a specific file,
        wherein a respective edge indicates an interaction between respective users or between a respective user and a respective file or a respective record,
        wherein an interaction weight assigned to the respective edge indicates an amount of the interaction;
    monitoring an attempt by a target user to access at least one of a target file and a target record;
    computing a target interaction weight between the target user and at least one of the target file and the target record from the interaction graph; and
    in response to the target interaction weight being below a target threshold, at least one of:
        (i) filtering security alerts, wherein alerts that correspond to the target user and at least one of the target file and target record are flagged, and
        (ii) blocking access by the target user to the at least one of target file and target record.

2. The computer implemented method of claim 1, wherein the interaction weights are ground truth labels obtained by an unsupervised approach according to the analysis of the interaction events.

3. The computer implemented method of claim 1, wherein interaction weights of the interaction graph are computed by aggregating sub-weights of sub-graphs, and further comprising accessing at least one triplet of node-edge-node having a respective sub-interaction weight used to compute the target interaction weight, and
    providing at least one member of a group for indicating a context for the outcome of the target interaction weight, the group consisting of: the at least one triplet and corresponding sub-weight, an interaction category or the at least one triplet.

4. The computer implemented method of claim 1, wherein the target interaction weight between the target user and the at least one of target file and target record is computed as a function of at least one of:
    (i) interaction weights between the target user and at least one other user having interaction weights with the at least one of target file and target record above a social connection threshold, and
    (ii) interaction weights between the target user at least one of another file and another record having interaction weights with at least one other user above a file connection threshold.

5. The computer implemented method of claim 4, further comprising at least one of:
    (i) normalizing the interaction weights between the target user and each respective other user according to interaction between the respective other user and additional users connected by edges to the respective other user, and
    (ii) normalizing the interaction between the target user and each of the at least one of another file and another record according to interaction between the at least one of respective another file and respective another record and additional users connected by edges to the at least one of respective another file and respective another record.

6. The computer implemented method of claim 4, further comprising providing at least one member of a group for indicating a context for the outcome of the target interaction weight, the group consisting of: (i) the at least one other user, (ii) the interaction weights between the target user and the at least one other user, (iii) the at least one of another file and another record, (iv) the interaction weights between the target user at least one of another file and another record, (iv) at least one interaction type category of the interaction between the target user and the at least one other user, (v) at least one interaction type category of the interaction between the target user and the at least one of another file and another record, (vi) a time from an interaction of the target user with the at least one of target file and target record to a current time of the attempted access, (vii) a time from an interaction of the target user with other users that interacted with the at least one of target file and target record to the current time of the attempted access, and (viii) a time from an interaction of the target user with the at least one of target file and target record to a time from an interaction of the target user with other users that interacted with the at least one of target file and target record.

7. The computer implemented method of claim 4, further comprising:
adjusting interaction weights of the interaction graph according to a decay parameter computed as a function of at least one of: (i) a time from an interaction of the target user with the at least one of target file and target record to a current time of the attempted access, (ii) a time from an interaction of the target user with other users that interacted with the at least one of target file and target record to the current time of the attempted access, and (iii) a time from an interaction of the target user with the at least one of target file and target record to a time from an interaction of the target user with other users that interacted with the at least one of target file and target record.

8. The computer implemented method of claim 7, wherein the decay parameter is set according to a statistical distribution of (i), (ii), and (iii) for interactions between a plurality of users and/or a plurality of at least one of files and records.

9. The computer implemented method of claim 1, wherein the creating the interaction graph is iterated over a plurality of time intervals for computing a plurality of interaction graphs, and further comprising training a graph neural network on the plurality of interaction graphs, wherein obtaining the target interaction weight comprises obtaining the target interaction weight by feeding the target user and the at least one of target file and target record into the graph neural network.

10. The computer implemented method of claim 1, wherein the plurality of interaction evens are obtained from a plurality of data sensors and/or a plurality of application programming interfaces (APIs) that monitor user interactions over a network and/or within a plurality of interaction applications.

11. The computer implemented method of claim 1, wherein the plurality of interaction events are selected from a group consisting of: participating in an online meeting, organizing the online meeting, accessing a calendar event, sending email, receiving email, reading a file, sharing a file, creating a file, editing a file, accessing a record, reading a record, sharing a record, creating a record, and editing a record.

12. The computer implemented method of claim 1, wherein computing the interaction graph according to the analysis of the plurality of interaction events comprises:
converting action triplets of an edge-node-edge that connect between a first node and a plurality of second nodes, with a plurality of active edges indicating active interaction from the first node to each of the plurality of second nodes, and a plurality of passive edges indicating passive interaction between each pair of the plurality of second nodes,
dividing the respective interaction weights of each action triplet to a plurality of interaction weights assigned to the plurality of active edges and the plurality of passive edges.

13. The computer implemented method of claim 1, wherein computing the interaction graph according to the analysis of the plurality of interaction events comprises:
aggregating a plurality of edges between a first node and a second node representing a plurality of interactions of a plurality of sub-categories into a single edge representing a single interaction of a main category,
computing the interaction weight for the single edge by aggregating the plurality of interaction weights of the plurality of edges,
wherein a respective single edge connects each pair of nodes.

14. The computer implemented method of claim 1, wherein interaction weights of edges associated with an interaction type category indicating editing of at least one of a file and a record are assigned relatively higher weights than interaction weights of edges associated with an interaction type category indicating viewing of the at least one of file and record.

15. The computer implemented method of claim 1, wherein interaction weights of edges associated with a specific interaction type category selected from a plurality of interaction type categories is set according to a statistical analysis of the plurality of interaction types between a plurality of at least one of files and records and/or a plurality of users.

16. The computer implemented method of claim 1, further comprising providing the respective interaction weight for each respective interaction category for explainability of the target interaction weight.

17. The computer implemented method of claim 1, wherein the first dataset and the second dataset are implemented as sparse matrices having a size that is linearly proportional to an amount of interactions.

18. The computer implemented method of claim 1, wherein the edges are directional, and a respective interaction weight is assigned per directional edge.

19. The computer implemented method of claim 1, further comprising:
identifying at least one similar user that is similar to the target user;
identifying at least one of: similar file that is similar to the target file, and similar record that is similar to the target record;
computing a similar interaction weight for the at least one similar user and at least one of similar file and similar record;
and when the similar interaction weight is statistically significantly different than the target interaction weight, at least one of: setting the target interaction weight to the similar interaction weight, and generating an error message for further investigation.

20. A system for securing at least one of files and records, comprising:
at least one hardware processor executing a code for:
a) creating an interaction graph, by:
collecting a plurality of interaction events between users and between users and at least one of files and records,
computing the interaction graph according to an analysis of the plurality of interaction events, by normalizing data obtained from different data sources,
removing duplicates,
splitting the interaction graph into a plurality of sub-interaction graphs each created from plurality of interaction events collected over a different time interval,
for each sub-interaction graph, creating a plurality of sub-sub interaction graphs, each respective sub-sub interaction graph created by aggregating edges and nodes of sub-types of interaction categories into a respective interaction category, for each sub-sub interaction graph, computing a first dataset of interactions between users, a second dataset of interactions between users and at least one of files and records, and a third dataset of interactions between users that involve at least one of files and records, normalizing the first dataset, the second dataset, and the third dataset, wherein a set of the normalized first dataset, the normalized second dataset, and the normalized third dataset, is for each respective interaction category of a plurality of interaction categories for each time interval of a plurality of time intervals, selecting, for each set, the target user and at least one of target file and target record, to create selected first, second, and third datasets, creating a user interaction dataset by aggregating the first dataset and the second dataset, creating an interaction dataset by aggregating the second dataset and the third dataset, computing a respective interaction weight for each respective interaction category, and computing the target interaction weight as an aggregation of a plurality of interactions weights of a plurality of interaction categories, wherein a respective node of the interaction graph represents one of a specific user, a specific record, and a specific file, wherein a respective edge indicates an interaction between respective users or between a respective user and a respective file or a respective record, wherein an interaction weight assigned to the respective edge indicates an amount of the interaction, b) monitoring an attempt by a target user to access a at least one of target file and target record;

c) computing a target interaction weight between the target user and the at least one of target file and target record from the interaction graph; and d) in response to the target interaction weight being below a target threshold, at least one of:
  (i) filtering security alerts, wherein alerts that correspond to the target user and at least one of the target file and target record are flagged, and
  (ii) blocking access by the target user to the at least one of target file and target record.

21. A non-transitory medium storing program instructions for securing at least one of files and records, which, when executed by a processor, cause the processor to:

create an interaction graph, by:
  collecting a plurality of interaction events between users and between users and at least one of files and records,
  computing the interaction graph according to an analysis of the plurality of interaction events, by
    normalizing data obtained from different data sources,
    removing duplicates,
    splitting the interaction graph into a plurality of sub-interaction graphs each created from plurality of interaction events collected over a different time interval,
    for each sub-interaction graph, creating a plurality of sub-sub interaction graphs, each respective sub-sub interaction graph created by aggregating edges and nodes of sub-types of interaction categories into a respective interaction category,
    for each sub-sub interaction graph, computing a first dataset of interactions between users, a second dataset of interactions between users and at least one of files and records, and a third dataset of interactions between users that involve at least one of files and records,
    normalizing the first dataset, the second dataset, and the third dataset,
    wherein a set of the normalized first dataset, the normalized second dataset, and the normalized third dataset, is for each respective interaction category of a plurality of interaction categories for each time interval of a plurality of time intervals,
    selecting, for each set, the target user and at least one of target file and target record, to create selected first, second, and third datasets,
    creating a user interaction dataset by aggregating the first dataset and the second dataset,
    creating an interaction dataset by aggregating the second dataset and the third dataset,
    computing a respective interaction weight for each respective interaction category, and
    computing the target interaction weight as an aggregation of a plurality of interactions weights of a plurality of interaction categories,
  wherein a respective node of the interaction graph represents one of a specific user, a specific record, and a specific file,
  wherein a respective edge indicates an interaction between respective users or between a respective user and a respective file or a respective record,
  wherein an interaction weight assigned to the respective edge indicates an amount of the interaction;

monitor an attempt by a target user to access a at least one of target file and target record;

compute a target interaction weight between the target user and the at least one of target file and target record from the interaction graph; and in response to the target interaction weight being below a target threshold, at least one of:
  (i) filtering security alerts, wherein alerts that correspond to the target user and at least one of the target file and target record are flagged, and
  (ii) blocking access by the target user to the at least one of target file and target record.

* * * * *